United States Patent

Karaki

[11] Patent Number: 6,104,075
[45] Date of Patent: Aug. 15, 2000

[54] SEMICONDUCTOR TEMPERATURE SENSOR

[75] Inventor: Toshiro Karaki, Kanagawa-ken, Japan

[73] Assignee: Nissan Motor Co., Ltd., Kanagawa-ken, Japan

[21] Appl. No.: 09/047,441

[22] Filed: Mar. 25, 1998

[30] Foreign Application Priority Data

Mar. 26, 1997 [JP] Japan ................................. 9-073542
Sep. 18, 1997 [JP] Japan ................................. 9-253459

[51] Int. Cl.⁷ ................................................... H01L 31/58
[52] U.S. Cl. .......................... 257/467; 257/417; 257/426; 257/470; 438/54
[58] Field of Search .............................. 257/417, 426, 257/467, 470; 438/54

[56] References Cited

U.S. PATENT DOCUMENTS

| | | | |
|---|---|---|---|
| 4,896,199 | 1/1990 | Tsuzuki et al. | 357/28 |
| 5,070,322 | 12/1991 | Fujihara | 340/653 |
| 5,100,829 | 3/1992 | Fay et al. | 437/60 |
| 5,159,520 | 10/1992 | Toyooka et al. | 361/103 |
| 5,357,136 | 10/1994 | Yoshioka | 257/383 |
| 5,461,252 | 10/1995 | Nakura et al. | 257/470 |
| 5,500,547 | 3/1996 | Yamguchi et al. | 257/359 |
| 5,521,421 | 5/1996 | Fuhurata | 257/467 |
| 5,830,372 | 11/1998 | Hierold | 216/2 |

FOREIGN PATENT DOCUMENTS

| | | | |
|---|---|---|---|
| 003010718 | 9/1981 | Germany | 257/470 |
| 352032278 | 3/1977 | Japan | 257/470 |
| 356135963 | 10/1981 | Japan | 257/470 |
| 360042623 | 3/1985 | Japan | 257/467 |

*Primary Examiner*—Mahshid Saadat
*Assistant Examiner*—Edgardo Ortiz
*Attorney, Agent, or Firm*—McDermott, Will & Emery

[57] ABSTRACT

A polysilicon gate layer, a first n⁺ diffusion region serving as a drain region, and a second n⁺ diffusion region serving as a source region form a MOSFET, and then an operating point of the MOSFET is set into its saturation region by connecting a gate layer and a drain region of the MOSFET. The first and second n⁺ diffusion regions provide a first and a second leakage paths, respectively. A temperature sensor can be provided by use of the event that a leakage current flowing through the second leakage path is varied according to a substrate temperature. According to such configuration, scatter of detected temperatures due to scattering in manufacturing process can be reduced even if all scattering parameters in manufacturing process are considered. In addition, an required area of the temperature sensor can be made smaller since a high resistance value is not needed.

20 Claims, 22 Drawing Sheets

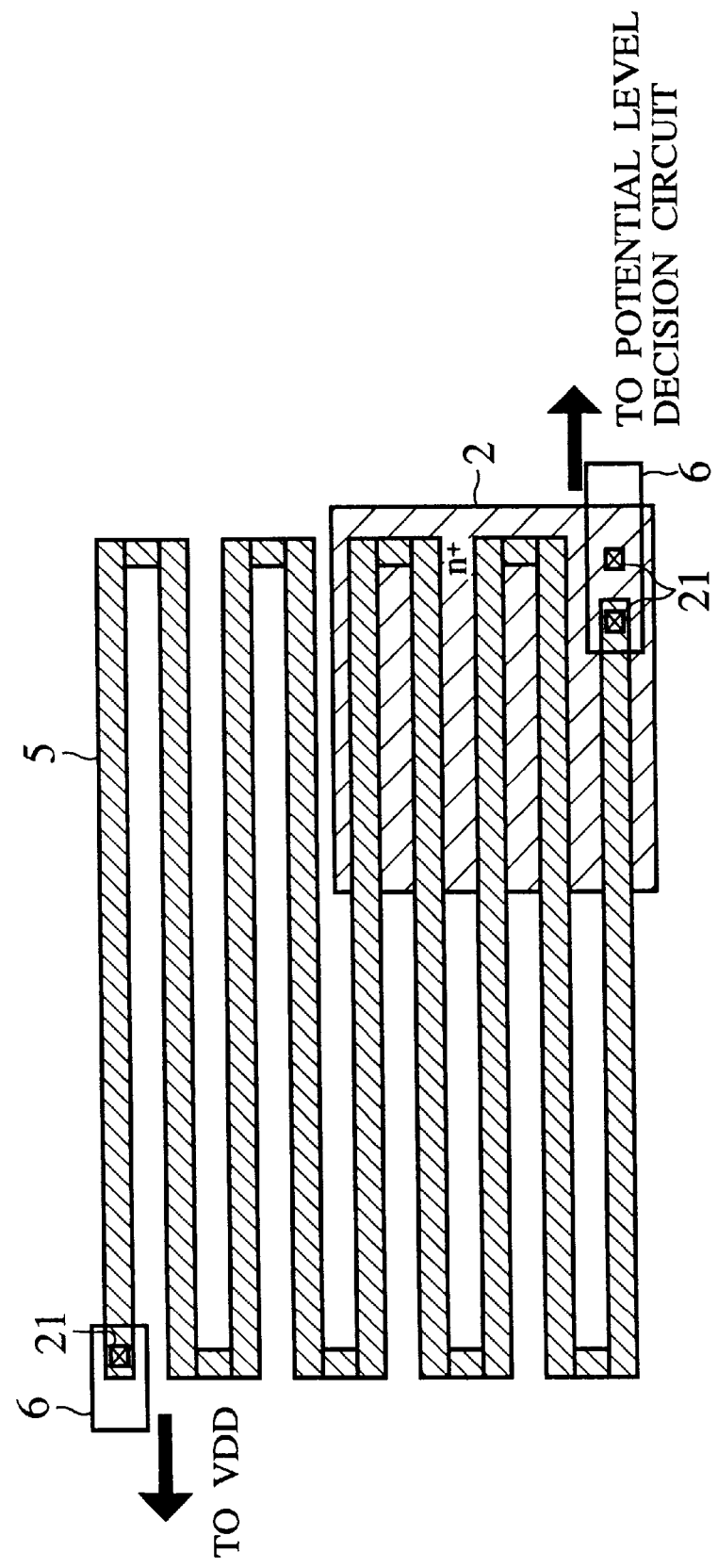

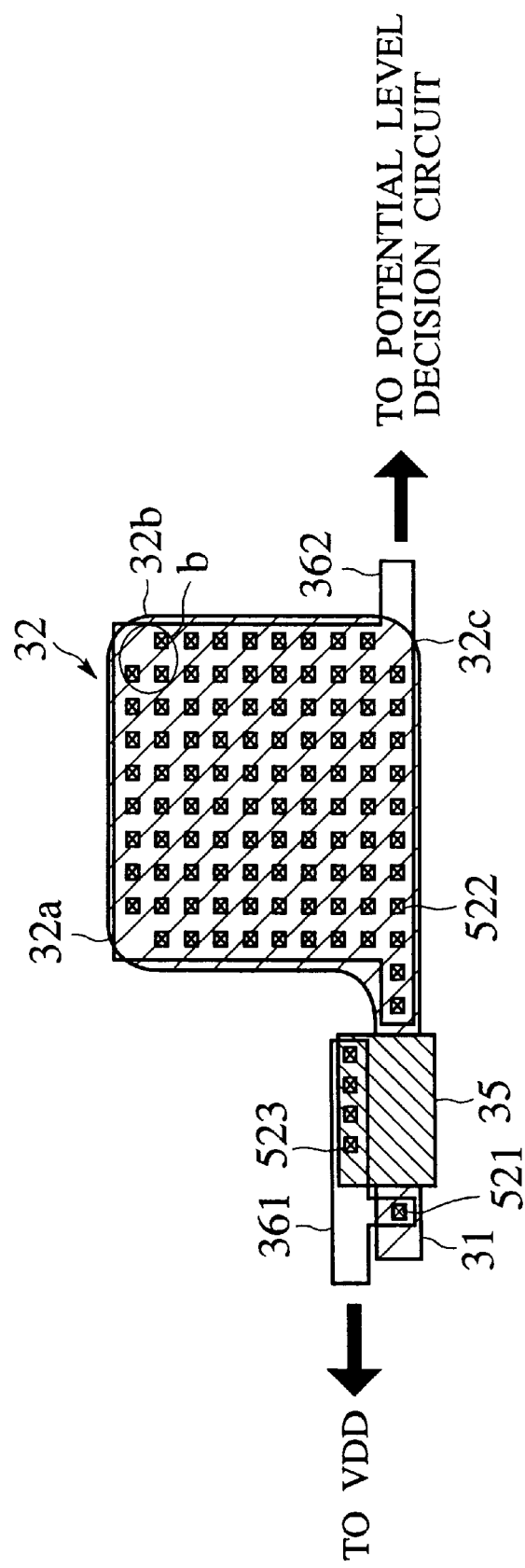

FIG.4

|  | RESULTS | REMARKS |
|---|---|---|
| RELATED ART | $5.3 \times 10^6 \cdot I_L$ | $R = 5.3\ [M\Omega]$ |
| PRESENT INVENTION | $\sqrt{8.2 \times 10^2 \cdot I_L}$ | $W = 5\ [\mu m]$<br>$L = 30\ [\mu m]$<br>$\beta_0 = 17.7\ [\mu S/V]$ |

FIG.5

| | ITEM | SCATTERING WIDTH | REDUCED SCATTERING WIDTH OF DETETED TEMPERATURE (°C) |
|---|---|---|---|
| RELATED ART | LEAKAGE CURRENT $I_L$ | 10~200% OF TYP. VALUE | 42.0 |
| | POLYSILICON RESISTIVITY | ±30% OF TYP. VALUE | 14.0 |
| | INPUT OFFSET OF COMPARATOR | ±10mV △ | 0.1 |
| | SPECIFIC PRECISION OF R8,R9 | ±2% △ | 1.2 |
| | TOTAL SCATTERING WIDTH | | 44.3 |
| PRESENT INVENTION | LEAKAGE CURRENT $I_L$ | 10~200% OF TYP. VALUE | 3.5 |
| | SCATTER OF Vth | ±20% OF TYP. VALUE | 4.9 |
| | SCATTER OF gm | ±20% OF TYP. VALUE | 6.1 |
| | INPUT OFFSET OF COMPARATOR | ±10mV ▲ | 0.4 |
| | SPECIFIC PRECISION OF R4,R5 | ±2% ▲ | 3.8 |
| | TOTAL SCATTERING WIDTH | | 9.4 |

FIG.14

| | G1 | G2 | C | G1 | G2 | C | G1 | G2 | C | G1 | G2 | C |
|---|---|---|---|---|---|---|---|---|---|---|---|---|
| SEQUENCE 1 | "H" | "H" | "L" | "H" | "H" | "L" | "H" | "H" | "L" | "H" | "H" | "H" |
| SEQUENCE 2 | "L" | "H" | "L" | "L" | "H" | "L" | "L" | "H" | "H" | "L" | "H" | "H" |
| SEQUENCE 3 | "L" | "L" | "L" | "L" | "L" | "H" | "L" | "L" | "H" | "L" | "L" | "H" |
| TEMPERATURE REGION | Tx<1 | | | 1≤Tx<2 | | | 2≤Tx<3 | | | 3≤Tx | | |
| STATE (MODE) | NORMAL | | | WARNING | | | HIGH TEMP. | | | EMERGENCY HALT | | |

SEMICONDUCTOR TEMPERATURE SENSOR

BACKGROUND OF THE INVENTION

1. Field of the Invention

The present invention relates to a temperature sensor integrated on a semiconductor substrate.

2. Description of the Related Art

As the conventional temperature sensors integrated on a semiconductor substrate, there is a temperature sensor shown in FIGS. 1A, 1B, 2A and 2B. FIG. 1A is a sectional view showing a part of a configuration of a conventional temperature sensor. FIG. 1B is a plan view corresponding to the sectional view in FIG. 1A. FIG. 2A is a characteristic view showing temperature dependence of potential at respective portions of the circuit. FIG. 2B is a characteristic view showing dispersion or scatter of detected temperatures.

First, a configuration of the temperature sensor will be explained with reference to FIG. 1A hereunder. A circuit shown in FIG. 1A is composed of an $n^+$ diffusion region 2 and a $p^+$ diffusion region 3 formed in a p type substrate 1, an interlayer insulating layer 4, a polysilicon resistor layer 5, an Al wiring layer 6, and a potential level discriminator 7. The potential level discriminator 7 is made up of resistors R8, R9 and a comparator 10. An explanation will be made in the following under the assumption that an input impedance of the comparator 10 is infinity. One end of the polysilicon resistor layer 5 is connected to VDD, and the p type substrate 1 is connected to GND via the $p^+$ diffusion region 3. Needless to say, though not shown as a device structure in FIG. 1A, the potential level discriminator 7 may be integrated on the p type substrate 1. The resistors R8, R9 in the potential level discriminator 7 are formed of polysilicon resistor which can be formed by the same process as the manufacturing process of the device whose sectional structure is shown in FIG. 1A, etc. In the structure in FIG. 1A, a p-n junction between the $n^+$ diffusion region 2 and the p type substrate 1 serving as GND is isolated by reverse-biasing. A leakage current flows from the $n^+$ diffusion region 2 to the p type substrate 1 via the p-n junction interface, i.e., there exists a leakage path via the junction.

Next, an operation of the temperature sensor will be explained with reference to FIG. 2A hereunder. In FIG. 2A, an ordinate indicates potential at respective portions of the circuit and an abscissa indicates a temperature of the semiconductor substrate in which this circuit is merged. At first, behavior of potential at a point A in FIG. 1A will be explained. Though the value of the leakage current flowing from the $n^+$ diffusion region 2 to the p type substrate 1 is extremely small at near room temperature, such leakage current is increased like an exponential function when the temperature of the semiconductor substrate, i.e., the p type substrate 1 is increased. Hence, when the temperature of the semiconductor substrate is increased higher, potential at the point A becomes lower due to an increase in the leakage current flowing from the $n^+$ diffusion region 2 to the p type substrate 1. The value of the leakage current can be represented by a variable equivalent resistance (leakage conductance) from the $n^+$ diffusion region 2 to the p type substrate 1. Such variable leakage conductance is in proportion to an area of a junction isolation surface, i.e., an area of the n+ diffusion region 2. Meanwhile, potential drop at the point A can be determined by a resistance dividing ratio of the resistance value of the polysilicon resistance layer 5 to the variable equivalent resistance. Accordingly, potential drop at the point A can be determined by both the area of the $n^+$ diffusion layer 2 and the resistance value of the polysilicon resistance layer 5.

Next, care to potential at a point B in the potential level discriminator 7 will be taken hereunder. Assume that VDD supplied to this circuit has no dependence upon the semiconductor substrate temperature, potential at the point B does not have dependence upon the semiconductor substrate temperature so that the value can be decided by a resistance dividing ratio between the resistor R8 and the resistor R9. Hence, if potential at the point B is set low rather than that at the point A when the semiconductor substrate temperature is low, potential at the point A is gradually lowered as the semiconductor substrate temperature is increased. Thus, a point at which potential at the point A intersects with potential at the point B can be obtained at a certain temperature. Therefore, if such intersect point is assumed as a detected temperature Tx and then this point is detected by the comparator, it can be detected when the semiconductor substrate temperature comes up to the detected temperature Tx. At this time, an output of the comparator is shifted from "L (low level)" to "H (high level)".

However, there has been problems set forth in the following in such related art.

First, there has been such a problem that scatter of the detected temperature Tx generated by scatter in manufacturing process is considerable. The major scatter in manufacturing process is the scatter of the leakage current generated by the scatter of impurity concentration in the region which forms the leakage path. Hence, the scatter of the detected temperatures Tx occurs due to the scatter in the leakage current in a relationship between the potential at the point A and the semiconductor substrate temperature. As shown in FIG. 2B, a considerable scatter $\Delta Tx$ is generated in the actually detected temperature Tx. Further, it has been known that generally such scatter of the leakage current is relatively large and, of course, the scatter $\Delta Tx$ of the detected temperature is also significant. This aspect will be explained later in detail in embodiments with reference to the results of rough estimation.

Also, as evident from the plan view shown in FIG. 1B, since the $n^+$ diffusion region 2 is brought into contact with the Al wiring pattern 6 via only one window, i.e., a contact hole 21, the temperature sensor is susceptible to scatter of resistance in the $n^+$ diffusion region caused by scatter in manufacturing process.

It will be explained in the following why several serious problems are caused if the scatter $\Delta Tx$ is included in the detected temperature.

The first problem is a disadvantage caused when an upper limit of the scatter $\Delta Tx$ of the detected temperature exceeds an upper limit temperature of the package and the bonding wire, or conversely a lower limit of the scatter $\Delta Tx$ of the detected temperature is lowered to enter into the normal operation temperature range of the circuit main body. First, if the upper limit of the scatter $\Delta Tx$ of the detected temperature exceeds the upper limit temperature of the package and the bonding wire, troubles in the reliability of the package and the bonding wire are caused before an output indicating the fact that the temperature of the semiconductor circuit has been increased can be output by the temperature sensor, so that it is likely that functions of IC are lost. While, in the IC chip in which the temperature sensor is merged, it is common to halt or limit an operation of the circuit main body using the output of the temperature sensor. If the lower limit of the scatter $\Delta Tx$ of the detected temperature is within the normal operation temperature range of the circuit main body, such a situation occurs that the operation of the circuit main body is halted or limited though the circuit is to be normally operated at the temperature. As a result, the detected temperature of the temperature sensor should be set to be lower than the upper limit temperature of the package or the bonding wire but higher than the normal operation temperature range of the circuit main body. In other words, the scatter ΔTx of the detected temperature must be suppressed within an extremely small scattering range.

The second problem is that, since the $n^+$ diffusion region 2 is formed as a rectangle as shown in the plan view in FIG. 1B, electric field concentration occurs at four corners of the $n^+$ diffusion region 2, so that a distribution of the leakage current value is deviated. Therefore the conventional temperature sensor is not preferable in reliability.

The third problem is that a chip area for the temperature sensor becomes larger. An important aspect of the circuit is that, normally, the temperature from which the potential of A point descending should be set within a temperature range (150 to 200° C.), which is required as the detected temperature range of the temperature sensor. By the way, in this related art, the $n^+$ diffusion region to determine the leakage current value has been assumed to have a popular area (50 μm×50 μm) and the polysilicon resistance necessary for the detection at 175° C. has been calculated by the so-called SPICE simulator (simulation equipment for analogue circuits) under the following conditions. That is, in this simulation, it has been assumed that VDD=5 V, and the potential at which a curve representing the characteristic of the A point intersects that of the B point in FIG. 2A is 2.5 V. Further, the leakage current of the $n^+$ diffusion region has been modeled by the p-n diode, and the leakage current value has been calculated with considering SPICE parameters (area parameter only, others are in default) in the situation that the leakage path is formed of the 50 μm×50 μm p-n junction and the leakage current at 180° C. is set to 0.6 μA with reference to actually measured data. As a result, the polysilicon resistance value of 5.3 MΩ has been needed.

A very long polysilicon resistor pattern is needed to achieve the polysilicon resistance value of 5.3 MΩ Hence, in the layout in which the polysilicon resistor pattern 5 is formed on the $n^+$ diffusion region 2, as shown in FIG. 1A, an area necessary for the polysilicon resistor pattern 5 is increased.

Like the above, in the conventional temperature sensor, there have been the problem caused by scatter of the detected temperature and the problem that an area necessary for formation of the circuit is increased.

In addition, it may be thought of that a hysteresis circuit is attached to stabilize the detected temperature output in the neighborhood of the detected temperature. However, if the hysteresis circuit is attached to the conventional temperature sensor, there has been the problem that scatters of the detected temperature and the return temperature would be increased due to scattering in manufacturing process, which is generated by an influence of the leakage path, rather than the case where no hysteresis circuit is attached.

SUMMARY OF THE INVENTION

The present invention has been made to overcome the above problems in the related art and it is an object of the present invention to provide a temperature sensor capable of improving reliability by suppressing scatter of detected temperatures.

It is another object of the present invention to reduce an area necessary for layout of patterns for the temperature sensor.

It is still another object of the present invention to provide a temperature sensor capable of suppressing an influence of a leakage path when a hysteresis circuit is attached to the temperature sensor.

In order to achieve the above objects, according to a first aspect of the present invention, there is provided a semiconductor temperature sensor comprising a semiconductor substrate of first conductivity type; a first semiconductor region of second conductivity type formed on the semiconductor substrate; a second semiconductor region of second conductivity type formed on the semiconductor substrate; a gate insulating film formed on the semiconductor substrate between the first semiconductor region arid the second semiconductor region; a gate electrode layer formed on the gate insulating film; means for biasing the semiconductor substrate to a predetermined potential by connecting the semiconductor substrate to a first power supply; a first wiring for connecting the first semiconductor region and the gate electrode layer mutually and connecting the first semiconductor region and the gate electrode layer to a second power supply; and a potential level discriminator connected to the second semiconductor region via a second wiring; wherein a temperature sense output is provided by an output of the potential level discriminator. Where "the second conductivity type" means a conductivity type opposite to the first conductivity type. That is, if the first conductivity type is p type, the second conductivity type is n type. If the first conductivity type is n type, the second conductivity type is p type.

The potential level discriminator comprises a first resistor connected to the second power supply, a second resistor connected to the first resistor, and a comparator having one input terminal which receives a potential at a connection point between the first resistor and the second resistor and another input terminal which receives a potential at the second wiring. With the above configuration, the MOSFET whose drain region is formed by the first semiconductor region serving as the first leakage path and whose source region is formed by the second semiconductor region serving as the second leakage path can be formed, and then the operation region of the MOSFET can be set to "the saturation region" by connecting the gate electrode layer and the drain region of the MOSFET by means of the first wiring. "The saturation region" is a region where the drain current of MOSFET will not change but will remain almost constant even though the drain voltages become larger.

According to the first aspect of the present invention, as shown in FIG. 5 later, if all scattering parameters in manufacturing process are considered, scatter of the detected temperature due to the scatter in manufacturing process can be reduced small rather than the related art. Since only one MOSFET is required, an area needed to form the temperature sensor can be made small in comparison with the layout shown in FIG. 1B in which the large resistor area must be needed.

If the hysteresis circuit is added, influence of the leakage path can be reduced and also scatter of the detected temperature and the return temperature due to the scatter in manufacturing process can be reduced. Since the hysteresis circuit can be attained by adding slight constituent elements to the temperature sensor main body, the chip area can be reduced in size. In addition, if a plurality of MOSFETs are provided in parallel with the MOSFET to detect plural chip temperature states (more than three temperature ranges), overall operation of the IC chip can be controlled more precisely according to the temperature states (temperature ranges) of the chip, so that the fail-safe function can be improved. Moreover, if plural second semiconductor regions are provided and arranged separately at plural locations of the semiconductor chip on which the temperature sensor is provided, such heat generation can be detected quickly even when heat generation occurs at any location of the IC chip. According to a second aspect of the present invention, there is provided a semiconductor temperature sensor comprising a first transistor whose substrate is connected to a first power supply and whose gate electrode and drain electrode are connected to a second power supply; a first leakage path connected to the drain electrode; a second leakage path connected to the source electrode of the first transistor; a first resistor connected to the second power supply; a second resistor connected to the first resistor; and a comparator having one input terminal which receives a potential at a connection point between the first resistor and the second resistor and another input terminal which receives a potential at the source electrode. Where MOSFET, MISFET, MOSSIT, HEMT, etc. are preferable for the first transistor. In particular, the MOSFET is preferable.

The first transistor can be operated in the saturation region by connecting the gate electrode and the drain electrode, so that an almost constant drain current can be kept. As a result, the temperature sensor can be provided in which the scatter of the detected temperature due to the scatter in manufacturing process can be lessened and the reliability can be enhanced. In addition, since an occupied area of the first transistor is small, the chip area can be reduced.

Furthermore, if the second transistor is aligned in parallel to the first transistor, hysteresis operation can be achieved, so that influence of the leakage current can be reduced and also scatter of the detected temperature and the return temperature due to the scatter in manufacturing process can be lessened. In addition, if a plurality of MOSFETs are provided in parallel to the first transistor so as to detect more than three chip temperature states (temperature regions), overall operation of the IC chip can be controlled more precisely according to the temperature states of the chip, so that the fail-safe function can be improved.

Moreover, if plural leakage paths are provided in parallel to the second leakage path at plural locations of the semiconductor chip, which is equivalent to the distributed arrangement of the temperature sensors, such heat generation can be detected quickly even when heat generation occurs at any location of the IC chip.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 1B is a plan view showing the temperature sensor shown in FIG. 1A;

FIG. 3B is a plan view showing the temperature sensor according to the first embodiment of the present invention;

FIG. 4 is a table comparing the results of calculation to show the influences of scatter of leakage currents upon both the temperature sensors according to the first embodiment of the present invention and that according to the related art as the basis of the present invention;

FIG. 5 is a table comparing total scattering widths of various parameters in both the temperature sensor according to the first embodiment of the present invention and that according to the related art as the basis of the present invention;

FIG. 14 is a table showing relationships between outputs C of a comparator and the temperature states (modes) in three operation sequences;

FIG. 15B is a plan view showing an example of an arrangement of a plurality of temperature sense portions (leakage paths) in the temperature sensor according to the sixth embodiment of the present invention.

DETAILED DESCRIPTION OF THE EMBODIMENTS

Figure 1A:
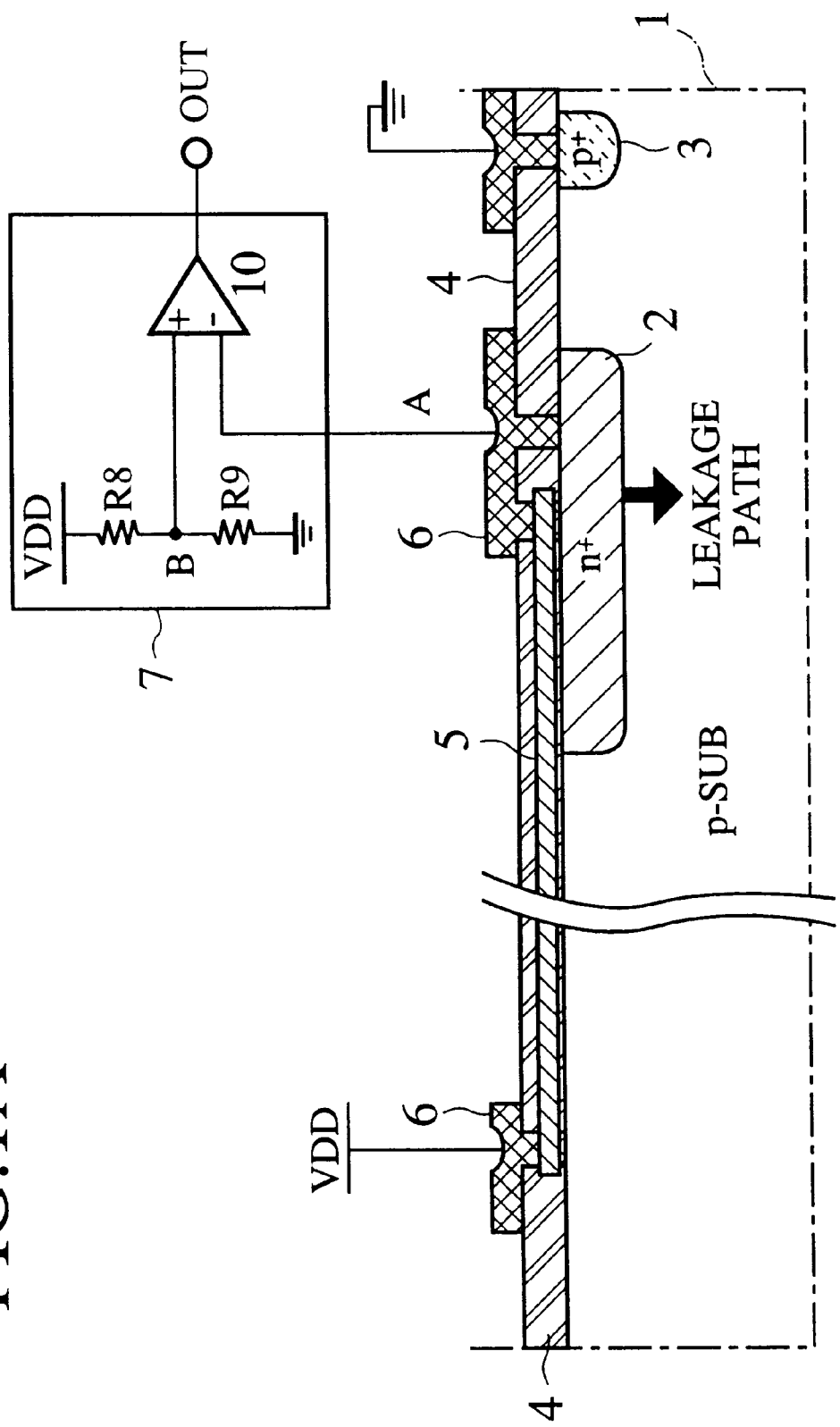
FIG. 1A is a sectional view showing an example of a temperature sensor as a basis of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of semiconductor devices, it will be appreciated that the various drawings are not drawn to scale from one figure to another nor inside a given figure, and in particular that the layer thickness are arbitrarily drawn for facilitating the reading of the drawings.

First Embodiment

Figure 3A:
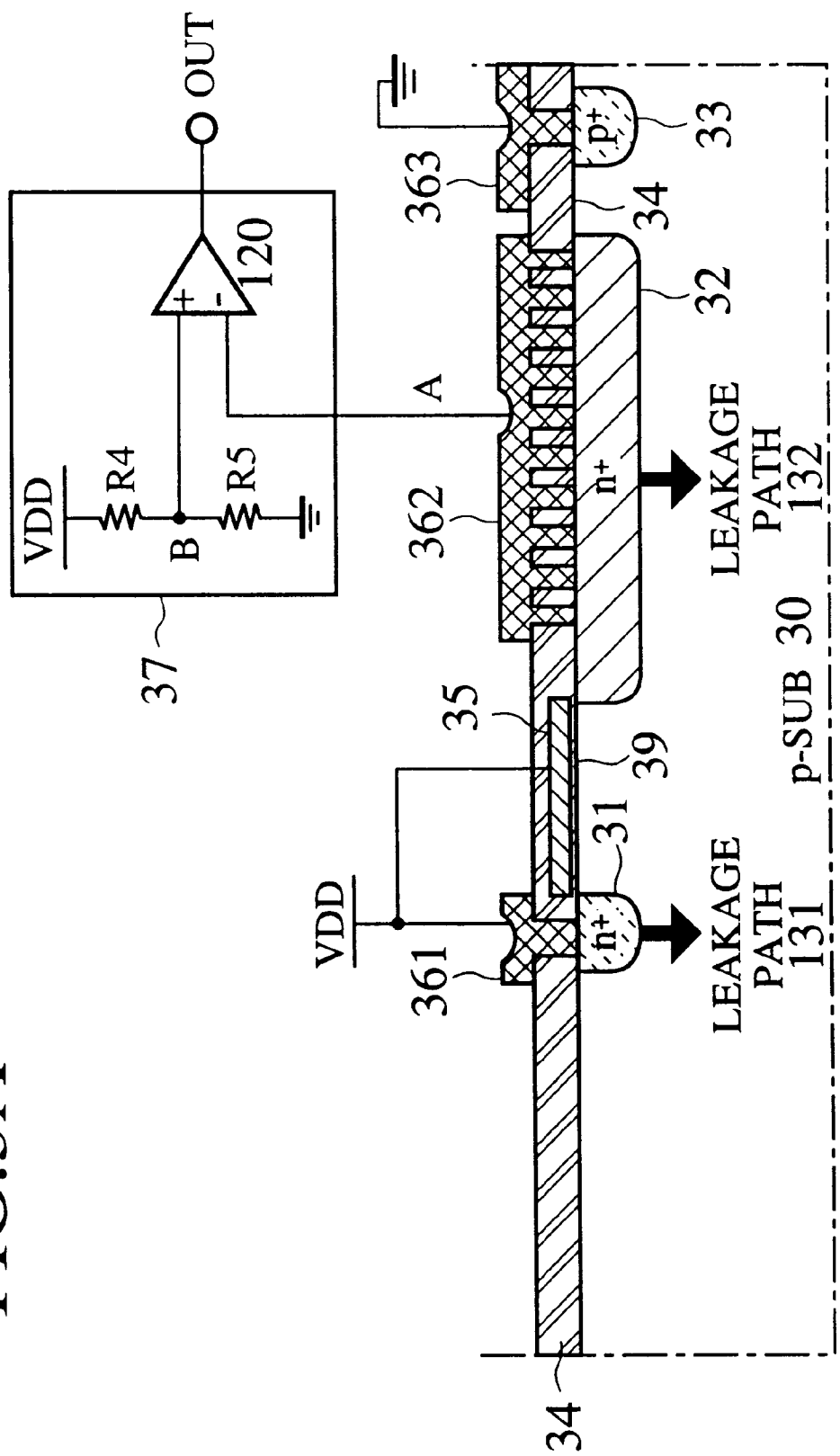
FIG. 3A is a sectional view showing a configuration of a temperature sensor according to a first embodiment of the present invention.

FIG. 3A is a sectional view showing a configuration of a temperature sensor according to a first embodiment of the present invention. As shown in FIG. 3A, the temperature sensor according to the first embodiment of the present invention comprises at least a first conductivity type semiconductor substrate (p type substrate) 30, a second conductivity type first semiconductor region (first n+ diffusion region) 31 formed on the semiconductor substrate 30, a second conductivity type second semiconductor region (second n+ diffusion region) 32 formed on the semiconductor substrate 30, a gate insulating film 39 formed between the first semiconductor region 31 and the second semiconductor region 32 on the semiconductor substrate 30, a gate electrode layer (polysilicon gate layer) 35 formed on the gate insulating film 39, a biasing means (33, 363) which connects the semiconductor substrate 30 to a first power supply (GND) to bias the semiconductor substrate 30 to predetermined potential, a first wiring (Al wiring layer) 361 which connects the first semiconductor region 31 and the gate electrode layer 35 mutually and connects them to a second power supply (VDD), and a potential level discriminator 37 connected to the second semiconductor region 32 through a second wiring (Al wiring layer) 362. An output of the potential level discriminator 37 can provide a temperature detection output OUT. As shown in FIG. 3A, the first conductivity type is p type and the second conductivity type is n type. Therefore, an n-channel MOSFET which uses the first semiconductor region 31 as its drain region and the second semiconductor region 32 as its source region can be formed. In addition, an operation region of this MOSFET is set to its saturation region by connecting the gate electrode layer 35 and the drain region 31 of this MOSFET via the first wiring 361. A first leakage path 131 is formed between the first semiconductor region 31 and the semiconductor substrate 30 and a second leakage path 132 is formed between the second semiconductor region 32 and the semiconductor substrate 30. In addition, potential of the second power supply (VDD) is set higher than that of the first power supply (GND).

As shown in FIG. 3A, the potential level discriminator 37 comprises a first resistor R4 connected to the second power supply (VDD), a second resistor R5 connected to the first resistor R4, and a comparator 120 having a positive side input terminal (+) which receives potential at the point B as a connection point between the first resistor R4 and the second resistor R5 and a negative side input terminal (−) which receives potential at the point A on the second wiring 362. Needless to say, though not shown as a device structure in FIG. 3A, the potential level discriminator 37 should be integrated on the p type substrate 30. The resistors R4, R5 are made of polysilicon resistor, etc. which are fabricated by the same process as that used to form the device structure shown in FIG. 3A. The output of the potential level discriminator 37 can provide the temperature detection output OUT. Following explanation will be made under the assumption that an input impedance of the comparator 120 is infinite.

Also, as shown in FIG. 3A, the temperature sensor according to the first embodiment of the present invention further comprises an insulating layer (interlayer insulating layer) 34 formed on the semiconductor substrate 30 and the gate electrode layer 35. As shown in the plan view of FIG. 3B, a first contact hole 521 is formed on the first semiconductor region 31 by removing a part of the interlayer insulating layer 34 to expose the first semiconductor region 31. Similarly, a plurality of second contact holes 522 are formed on the second semiconductor region 32 by removing a part of the interlayer insulating layer 34, and also a third contact hole 523 is formed on the gate electrode layer 35. The first wiring 361 connects the first semiconductor region 31 and the gate electrode layer 35 to the second power supply (VDD) via the first contact hole 521 and the third contact hole 523. The first wiring 362 connects the second semiconductor region 32 to the potential level discriminator 37 via the second contact holes 522. As shown in FIG. 3A, the biasing means of the temperature sensor according to the first embodiment of the present invention comprises a first conductivity type high impurity concentration contact region (p+ diffusion region) 33, a fourth contact hole arranged on the contact region 33, and the third wiring 363 which connects the contact region 33 and the first power supply (GND) via the fourth contact hole.

Therefore, if the temperature sensor according to the first embodiment of the present invention will be explained as an equivalent circuit, such temperature sensor comprises at least a transistor (n-channel MOSFET) whose substrate is connected to the first power supply (GND) and whose gate electrode and drain electrode are connected to the second power supply (VDD) respectively, a first leakage path 131 connected to the drain electrode, a second leakage path 132 connected to the source electrode of the transistor, a first resistor R4 connected to the second power supply (VDD), a second resistor R5 connected to the first resistor R4, a comparator 120 having a positive side input terminal (+) which receives potential at a connection point between the first resistor R4 and the second resistor R5 (potential at the point B) and a negative side input terminal (−) which receives potential of the source electrode (potential at the point A). The temperature sensor according to the first embodiment of the present invention differs from the temperature sensor shown in FIGS. 1A and 1B in that the MOSFET whose operation region is set to the saturation region is employed in place of the long polysilicon resistor 5 and that, as shown in the plan view of FIG. 3B, a plurality of contact holes 522 are formed on the second n+ diffusion region 32.

Next, an operation of the temperature sensor will be explained hereunder. First, an operational image in the first embodiment of the present invention will be explained. When VDD is applied to the first n+ diffusion region 31 and the polysilicon gate layer 35, an inversion layer is generated in the surface of p type substrate 30 directly beneath the polysilicon gate layer 35 and then potential is supplied to the point A via carriers flowing in the inversion layer. Potential at the point A is decreased as the leakage current from the second n+ diffusion region 32 is increased with the increase in temperature. In other words, the temperature dependence of the point A has a profile similar to that in the related art.

In the related art and the first embodiment of the present invention, an influence of the leakage current at the point A will be analyzed by mathematical expressions. In the following, potential at the point A is assumed as Vx and the current value of the leakage path is assumed as $I_L$.

First of all, in the related art, $$(VDD-Vx)/R=I_L \qquad (1)$$

Where R is a resistance value of the polysilicon resistor layer. Therefore, $$Vx=VDD-I_L \cdot R \qquad (2)$$

On the contrary, in the first embodiment of the present invention, the MOSFET operates in its saturation region since the gate electrode and the drain electrode are connected.

First, a fundamental expression of the drain current $I_D$ in the saturation region is given as $$I_D = [(\beta o \cdot W)/2L](Vgs-Vth)^2 \quad (3)$$

An expression which can be obtained by applying the above Eq.(3) to the first embodiment is given as $$I_L = [(\beta o \cdot W)/2L](VDD-Vx-Vth-\Delta Vth)^2 \quad (4)$$

Where

Vds: drain-source voltage of the MOSFET

Vgs: gate-source voltage of the MOSFET

W: gate width of the MOSFET

L: gate length of the MOSFET

βo: constant defined according to a gate structure of the MOSFET

Vth: threshold value of the MOSFET

ΔVth: variation of the threshold value of the MOSFET by the backgate bias

Subsequently, if the above Eq.(4) can be rewritten with respect to Vx, $$Vx = VDD - Vth - \Delta Vth - \sqrt{(2L \cdot I_L)/(W)} \quad (5)$$

can be derived.

From Eqs.(2) and (5), a term which is susceptible to scattering of the leakage current becomes evident. That is, the second term in the right side (referred to as an "a term" hereinafter) of Eq.(2) is influenced in the related art, whereas the fourth term in the right side (referred to as a "b term" hereinafter) of Eq.(5) is influenced in the first embodiment of the present invention.

In the related art and the first embodiment of the present invention, if the temperature sensors have been designed to have the same leakage path area and sense the same detected temperature respectively, results of rough estimation of the "a term" and the "b term" is given in FIG. 4. Where, it has been assumed as the calculation conditions that the detected temperature Tx=175° C., VDD=5 V and the potential at which a curve representing the characteristic of the A point intersects that of the B point is 2.5 V. The circuit constants have been decided by the SPICE with considering SPICE parameters (area parameter only, others are in default) under the situation that the leakage path is formed of the 50 μm×50 μm p-n junction and the leakage current at 180° C. is set to 0.6 μA with reference to actually measured data. The circuit constant is R (see Eq.(2)) in the related art while the circuit constants are W, L (see Eq.(5)) in the first embodiment.

Figure 2A:
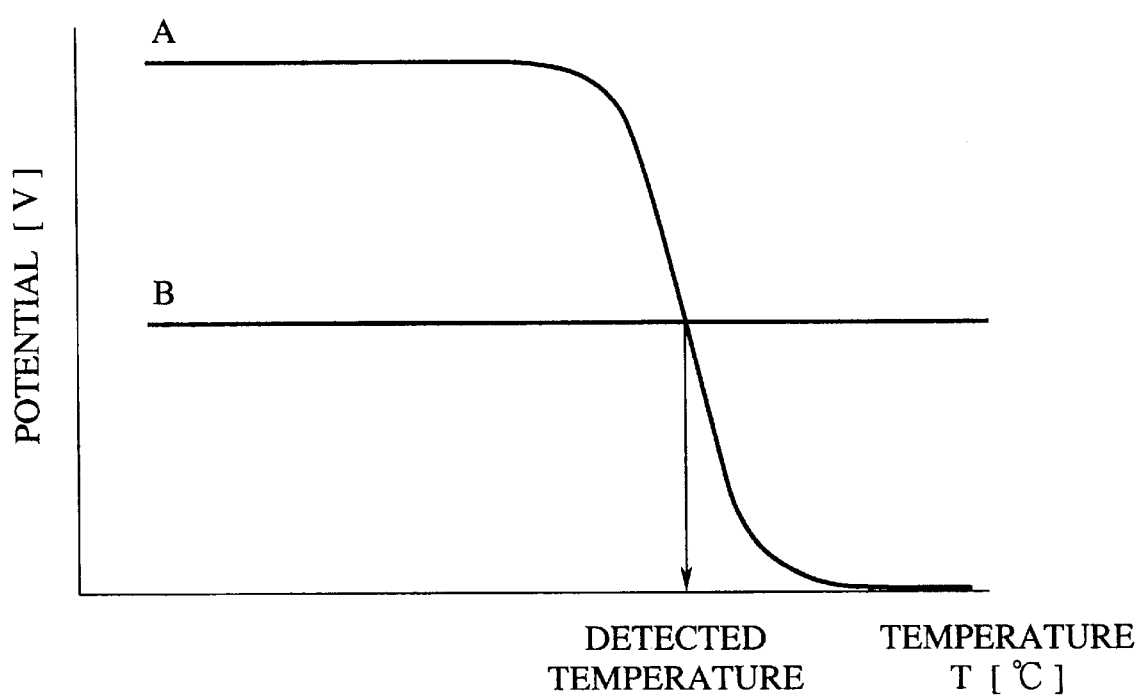
FIG. 2A is a characteristic view showing temperature dependence of potential at respective portions of the temperature sensor shown in FIGS. 1A and 1B.
Figure 2B:
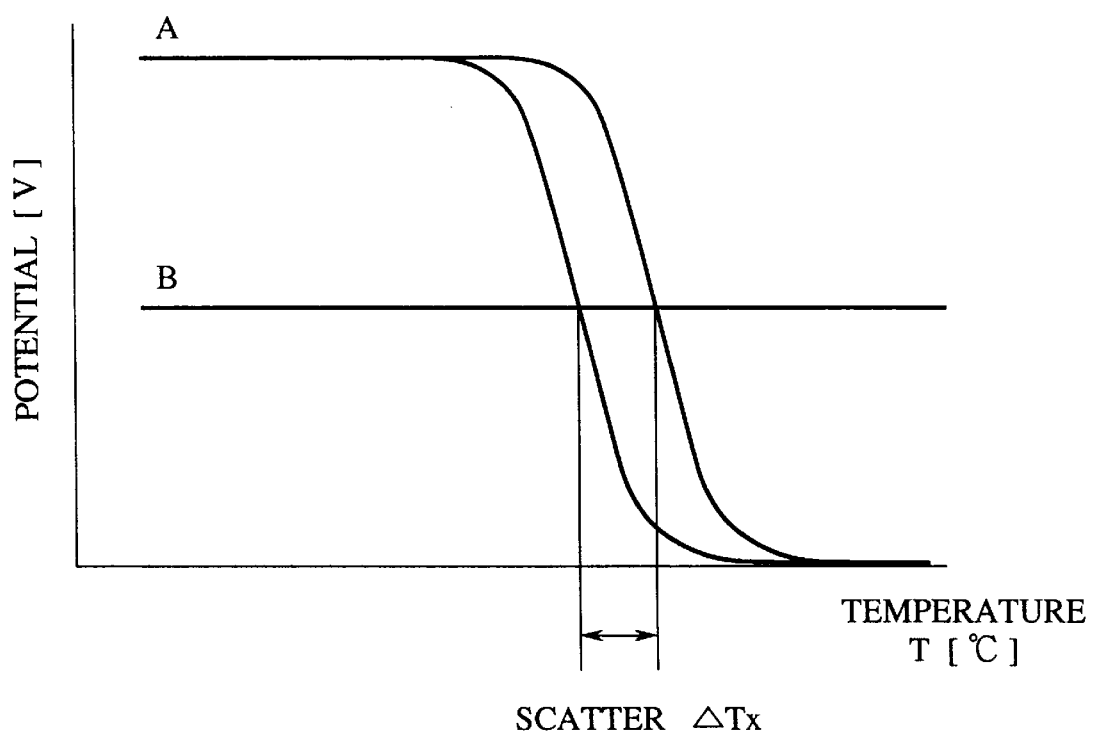
FIG. 2B is a characteristic view showing scatter of temperatures sensed by the temperature sensor shown in FIGS. 1A and 1B.

From the results shown in FIG. 4, it is evident that, in comparison with the related art, variation in potential at the point A relative to the leakage current $I_L$ can be suppressed in the first embodiment. However, in the first embodiment, the number of parameters in scatter in manufacturing process is increased rather than the related art. Hence, the above results may be considered as providing only insufficient verification. Hence, the scatters of the detected temperatures about to all parameters of the scatter in manufacturing process are calculated by the SPICE, and then total scattering widths of the detected temperatures are calculated as square roots of the sum of squares of respective parameters. Namely, the total scattering widths for the related art and the first embodiment are thus calculated and the results are shown in FIG. 5. Where it has been assumed that VDD=5 V and the potential at intersection point of curves representing the A point characteristic and the B point characteristic in FIG. 2A is 2.5 V. "A typ. value (center value)" of the leakage current $I_L$ are identical in the related art and the first embodiment. Further, the leakage current $I_L$ of the second n⁺ diffusion region has been modeled by the p-n diode, and the leakage current value has been calculated with considering SPICE parameters (area parameter only, others are in default) in the situation that the leakage path is formed of the 50 μm×50 μm p-n junction and the leakage current at 180° C. is set to 0.6 μA with reference to actually measured data. Further, it is assumed that the polysilicon resistance value= 5.3 MΩ in the related art and W/L of the MOSFET=5/30 μm in the first embodiment. SPICE parameters of the MOSFET are calculated by use of 5 μm-CMOS parameters. In FIG.5, Δ marked items are calculated based on the temperature dependence (−161 mV/° C.: calculated by SPICE) around the intersection point of curves representing the behaviors at the point A and the point B, and ▲ marked items are calculated based on the temperature dependence (−53 mV/° C. : calculated by SPICE) around the intersection point.

From the results in FIG. 5, it is evident that, even if all parameters of scatter in manufacturing process are taken into consideration, scatter of the detected temperatures due to scatter in manufacturing process can be made less in the first embodiment rather than the related art.

In addition, in the first embodiment, the temperature sensor is formed to have a planar pattern shown in FIG. 3B. Various features achieved by this pattern are as follows.

A first feature is that a multitude of contacts holes 522 to the Al wiring pattern 362 are provided on a substantially whole surface of the second n⁺ diffusion region 32. As a result, contact resistance between the second n⁺ diffusion region 32 serving as the source region of the MOSFET and the Al wiring 362 can be reduced, so that influence of scatter of the contact resistance generated by scatter in manufacturing process can be suppressed.

A second feature is that a pattern of the n⁺ diffusion region 2 serving as the leakage path in the related art is formed as a rectangle (and thus corner portions are formed as a right angle), whereas corner portions 32a, 32b, 32c of the second n⁺ diffusion region pattern 32 are rounded in the first embodiment. However, the corner portion opposing to the first n⁺ diffusion region 31, i.e., a lowermost left corner portion of the second n⁺ diffusion region 32 is not rounded. Thus, electric field concentration at the corner portions can be suppressed, the deviation of the distribution of the leakage current value can be controlled, and reliability of the temperature sensor can be improved.

A third feature is that, as shown in the circled "b" portion of FIG. 3B, the number of the second contact holes 522 to be formed at the corner portions 32a, 32b, 32c of the second n⁺ diffusion region 32 is made fewer than that at other portion. Thereby, resistance values at the corner portions 32a, 32b, 32c of the second n⁺ diffusion region 32 can be increased. Similarly to the first feature, electric field concentration at the corner portions can be suppressed, and reliability of the temperature sensor can be improved.

As shown in comparison of the scatter of the detected temperatures in the related art and the first embodiment, if the area of the n⁺ diffusion regions 2 and 32 serving as the leakage paths and the detected temperatures are set identically, the resistor area is increased in the related art since the extremely large resistance of 5.3 MΩ is needed, whereas the MOSFET portion having the W/L=5/30 μm may be formed in the first embodiment. It is apparent that a total area can be made smaller in the first embodiment.

Second Embodiment

Figure 6A:
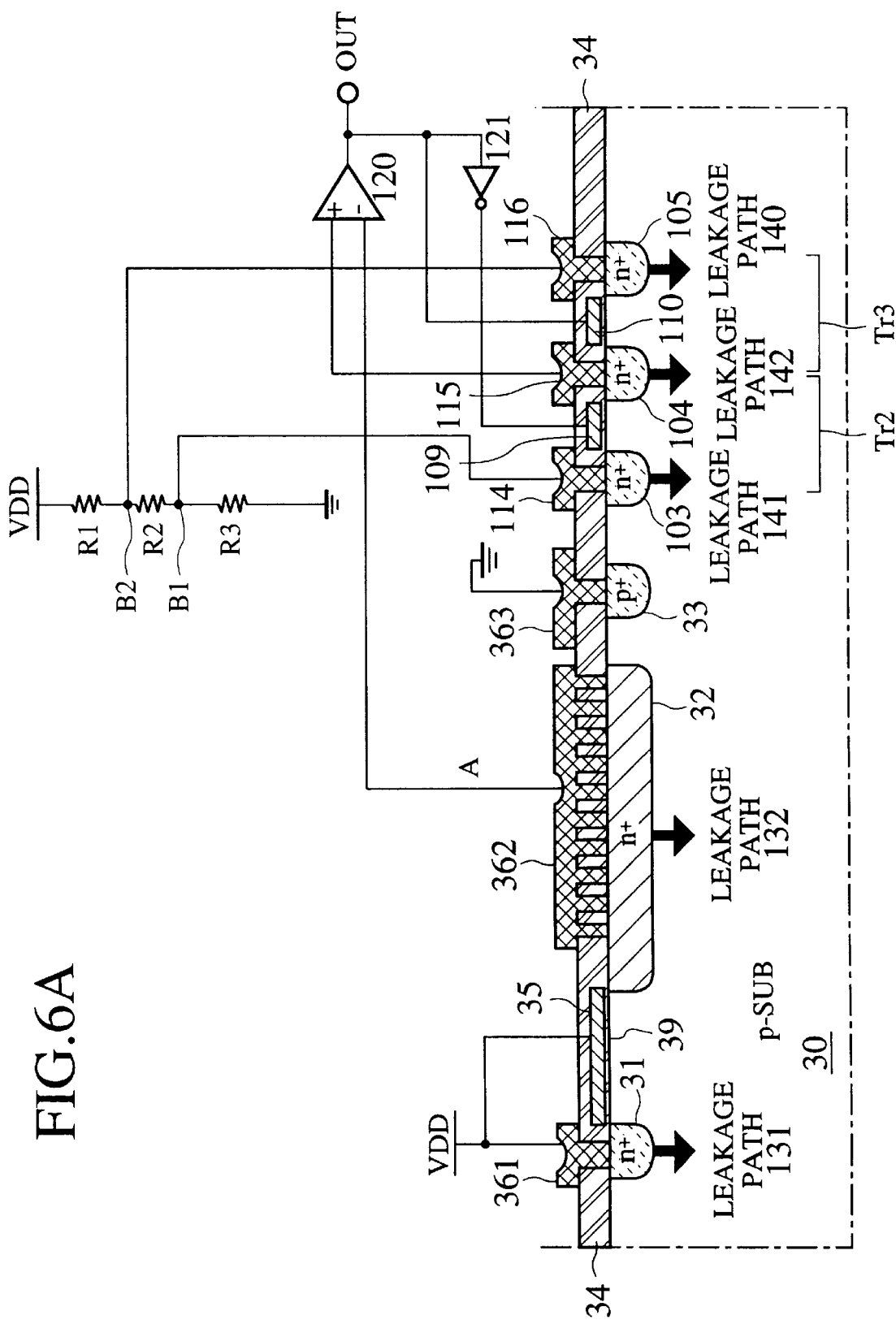
FIG. 6A is a sectional view showing a configuration of a temperature sensor with a hysteresis circuit according to a second embodiment of the present invention.
Figure 6B:
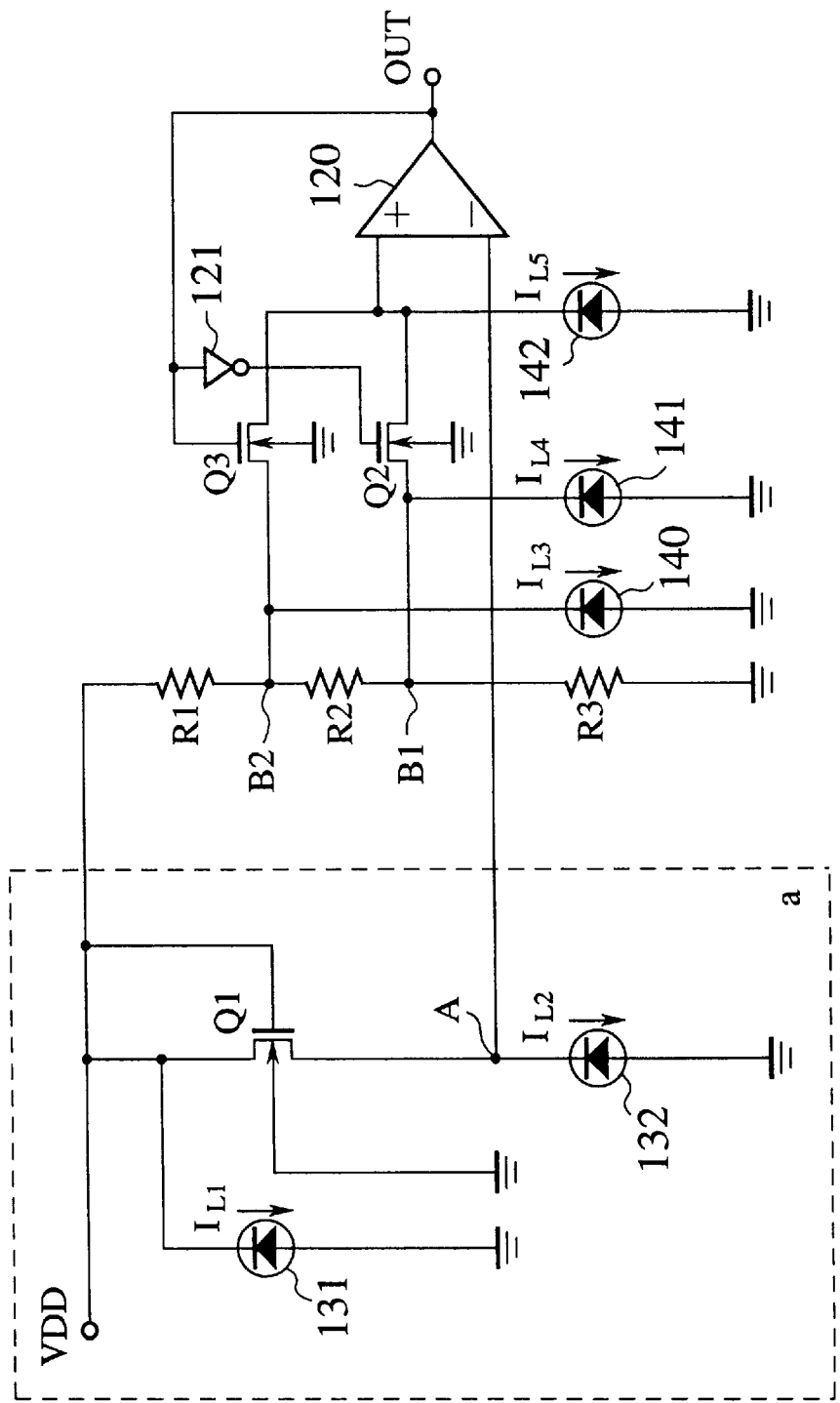
FIG. 6B is a circuit diagram showing the temperature sensor according to the second embodiment of the present invention.
Figure 7:
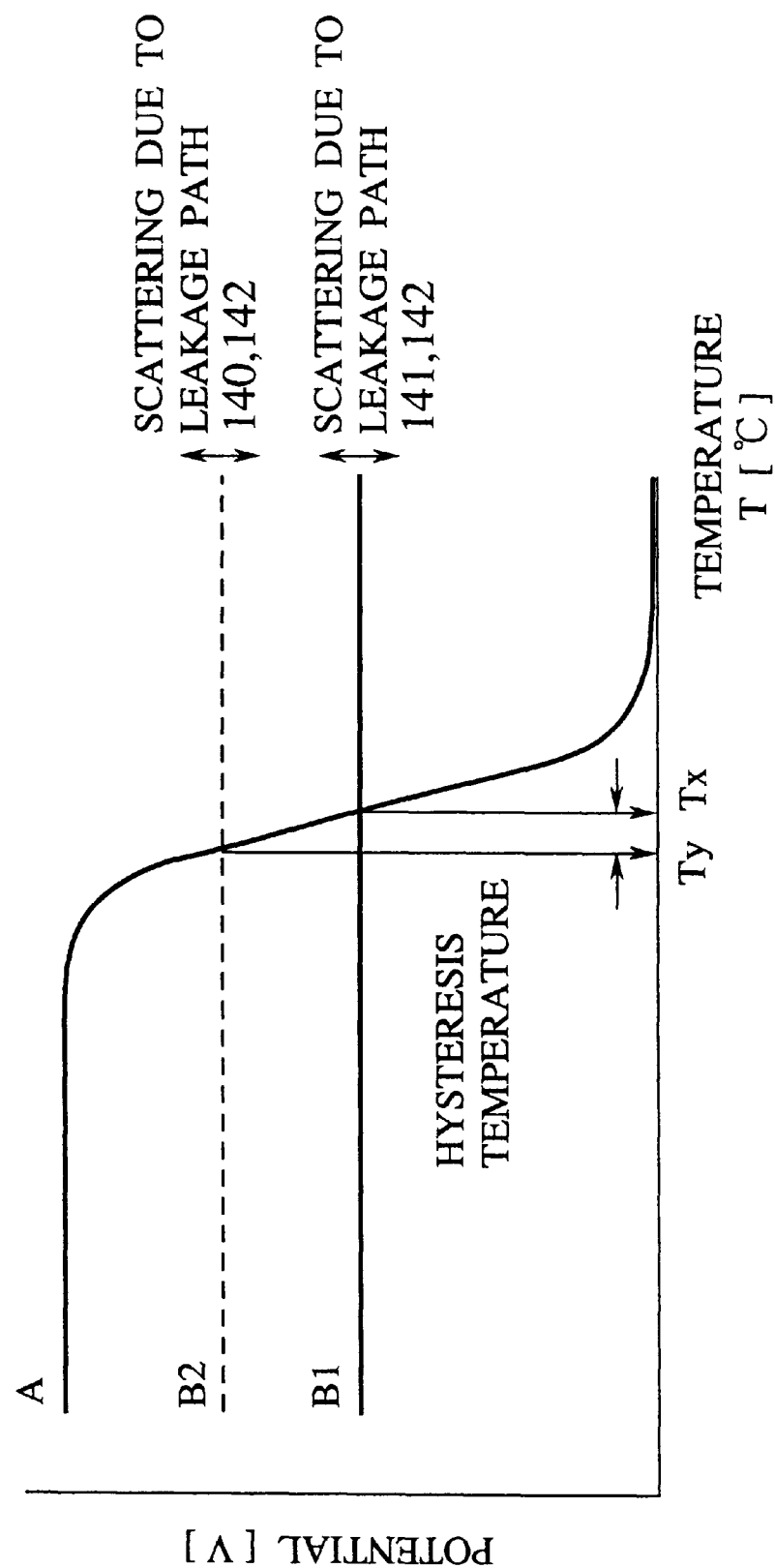
FIG. 7 is a characteristic view showing temperature dependence of potential at respective portions of the temperature sensor according to the second embodiment of the present invention.

Next, a second embodiment will be explained hereunder. In this second example, a hysteresis circuit to stabilize a temperature detection output near the detected temperature is attached to the first embodiment. FIG. 6A is a sectional view showing a configuration of a temperature sensor with the hysteresis circuit according to the second embodiment of the present invention. FIG. 6B is a circuit diagram showing the temperature sensor according to the second embodiment. FIG. 7 is a characteristic view showing temperature dependence of potential at respective portions of the temperature sensor according to the second embodiment. The configuration and operation of the temperature sensor with the hysteresis circuit according to the second embodiment will be explained with reference to FIGS. 6A, 6B, 7 hereinbelow.

First, a sectional shape of the temperature sensor will be explained with reference to FIG. 6A. The temperature sensor comprises a first n$^+$ diffusion region 31 formed in a p type substrate 30, second n$^+$ diffusion regions 32, 103 to 105, a p$^+$ diffusion region 33, an interlayer insulating layer 34, polysilicon gates 35, 109, 110, Al wirings 361, 362, 363, 114 to 116, resistors R1, R2, R3, a comparator 120, and an inverter 121. The polysilicon gate 35 and the first n$^+$ diffusion region 31 are connected to VDD and the p type substrate 30 is connected to GND via the p$^+$ diffusion region 33. It is of course that, though not shown as a device structure in FIG. 6A, the comparator 120, the inverter 121, and the resistors R1, R2, R3 may be formed on the p type substrate 30. The resistors R1, R2, R3 can be formed by the same process as that used to form the device structure shown in FIG. 6A. According to this sectional structure, it would be understood that leakage paths 131, 132, 140 to 142 are formed between the n$^+$ diffusion regions 31, 32, 103 to 105 and the p type substrate 30. This sectional structure can be transformed into a circuit diagram, as shown in FIG. 6B. In FIG. 6B, Q1, Q2, Q3 denote MOSFETs, having the polysilicon gates 35, 109, 110 shown in FIG. 6A, respectively.

In turn, the operation of the temperature sensor will be explained with refereence to the potential characteristic view shown in FIG. 7. In FIG. 7, an ordinate indicates the potential and an abscissa indicates the temperature of the semiconductor substrate. In this case, explanation will be made without influence of the leakage paths 140 to 142 in the hysteresis circuit. Also, in the following explanation, it is assumed that an input impedance of the comparator 120 is infinite and input offset is xero.

First, behavior of potential at the point A in FIG. 6B will be explained. If VDD is applied to the gate electrode and the drain electrode of the MOSFET Q1 when the temperature of the semiconductor substrate is low, the MOSFET Q1 is turned on and therefore potential is supplied to the point A as the source electrode of the MOSFET Q1. Then, if the leakage current of the leakage path 132 is increased as the temperature is increased, potential at the point A is reduced. That is, the temperature dependence of potential at the point A is quite similar to that in the first embodiment.

Then, behavior of potential at the points B1, B2 will be explained. Assume that VDD supplied to the temperature sensor has no dependence relative to the semiconductor substrate temperature, then potential at the points B1, B2 has also no dependence relative to the semiconductor substrate temperature. The values of potential at the points B1, B2 can be determined by the resistors R1, R2, R3. If the semiconductor substrate temperature is low (before it reaches the detected temperature Tx), "L" is output from the comparator 120 as the temperature detection output, so that the MOSFET Q3 is turned off and the MOSFET Q2 is turned on. Therefore, potential at the point B1 in FIG. 6B is input into one terminal of the comparator 120.

When the A point potential intersects with the B1 point potential in FIG. 6B as the temperature of the semiconductor substrate rises, the output of the comparator 120 changes from "L" to "H", whereby it can be detected that the temperature of the semiconductor substrate reaches a previously set detected temperature Tx. At this time, according to the output of the comparator 120, the MOSFET Q3 is turned on and the MOSFET Q2 is turned off, so that potential at the point B2 is input into one terminal of the comparator 120. Consequently, the point at which the output of the comparator 120 is changed as the temperature of the semiconductor substrate falls down is the return temperature Ty so that the hysteresis characteristic can be given to the temperature detection output.

Then, influence of the leakage paths 140 to 142 will be explained. As described above, scatters due to the scatter in manufacturing process are included in the leakage current values via the leakage paths 140 to 142. As explained in the first embodiment, scatter of the leakage current value due to the scatter in manufacturing process has little effect on potential at the point A in FIG. 6B. However, in the second embodiment of the present invention, since potential at the points B1, B2 in FIG. 6B is affected by the leakage paths 140 to 142, scatter of the detected temperature Tx and the return temperature Ty due to the scatter in manufacturing process is enhanced rather than the first embodiment.

Third Embodiment

Figure 8A:
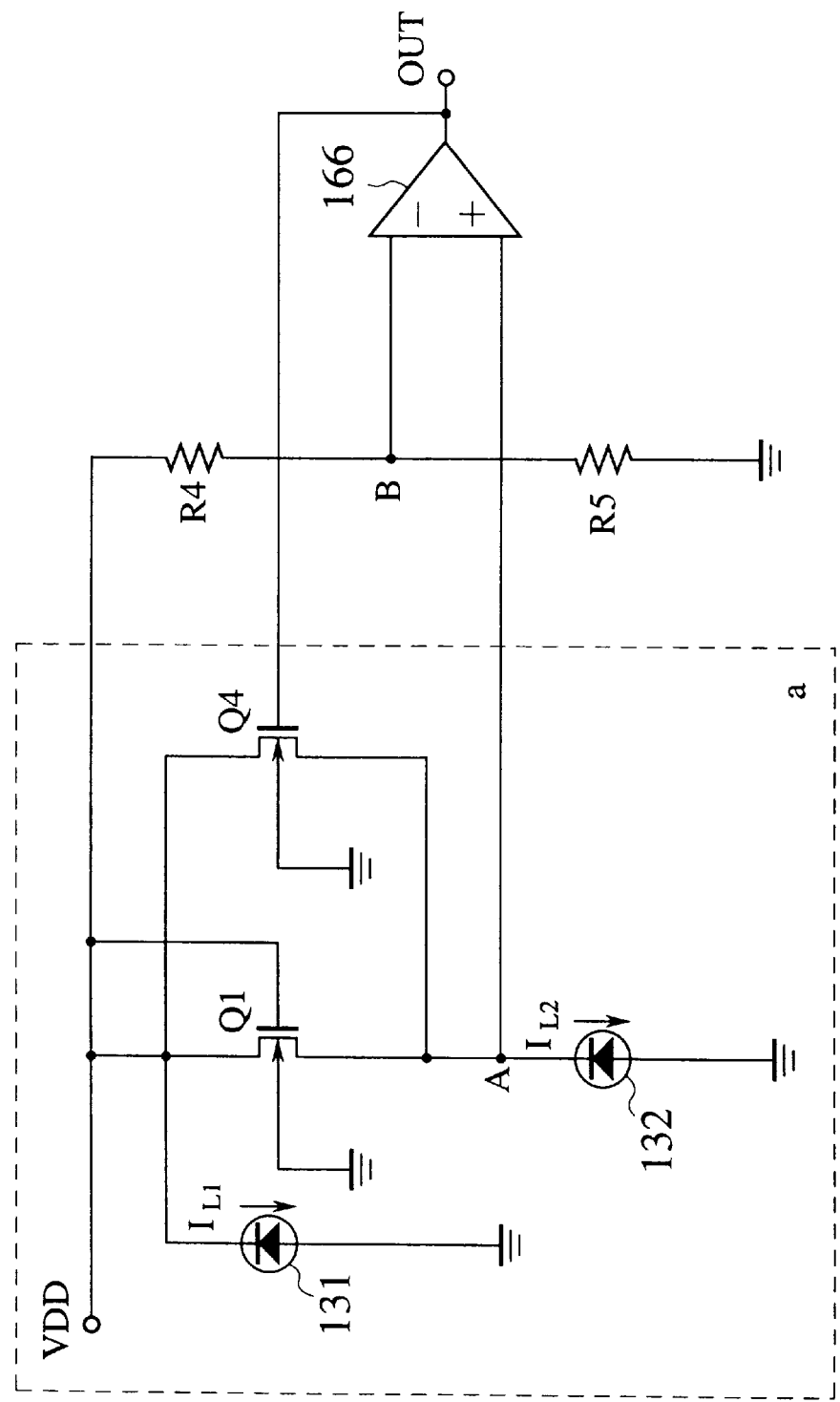
FIG. 8A is a circuit diagram showing a temperature sensor according to a third embodiment of the present invention.
Figure 8B:
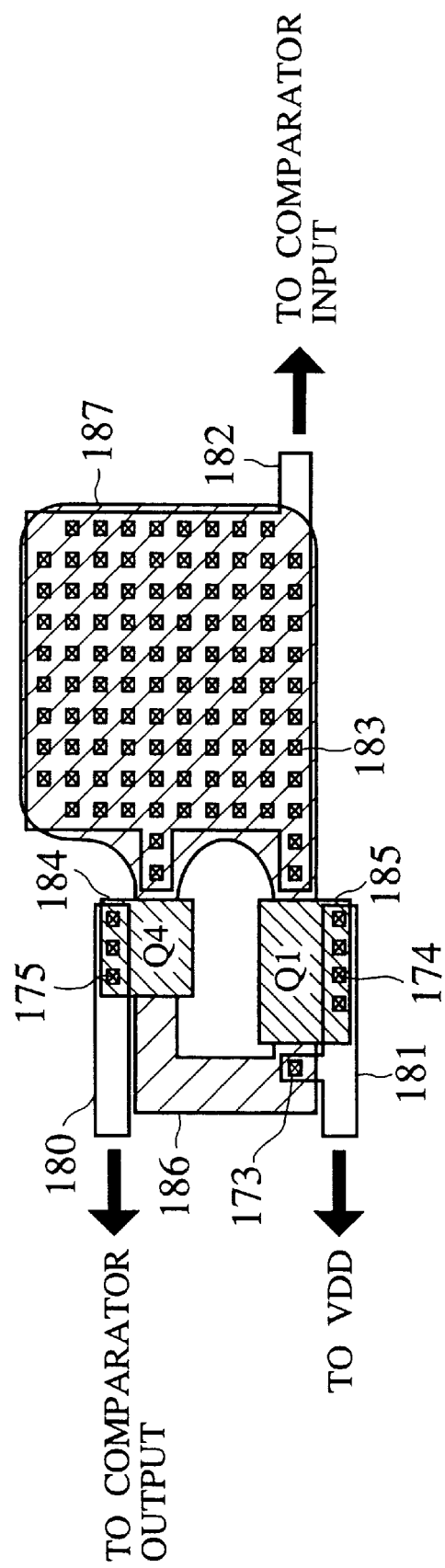
FIG. 8B is a plan view showing the temperature sensor according to the third embodiment of the present invention.
Figure 9:
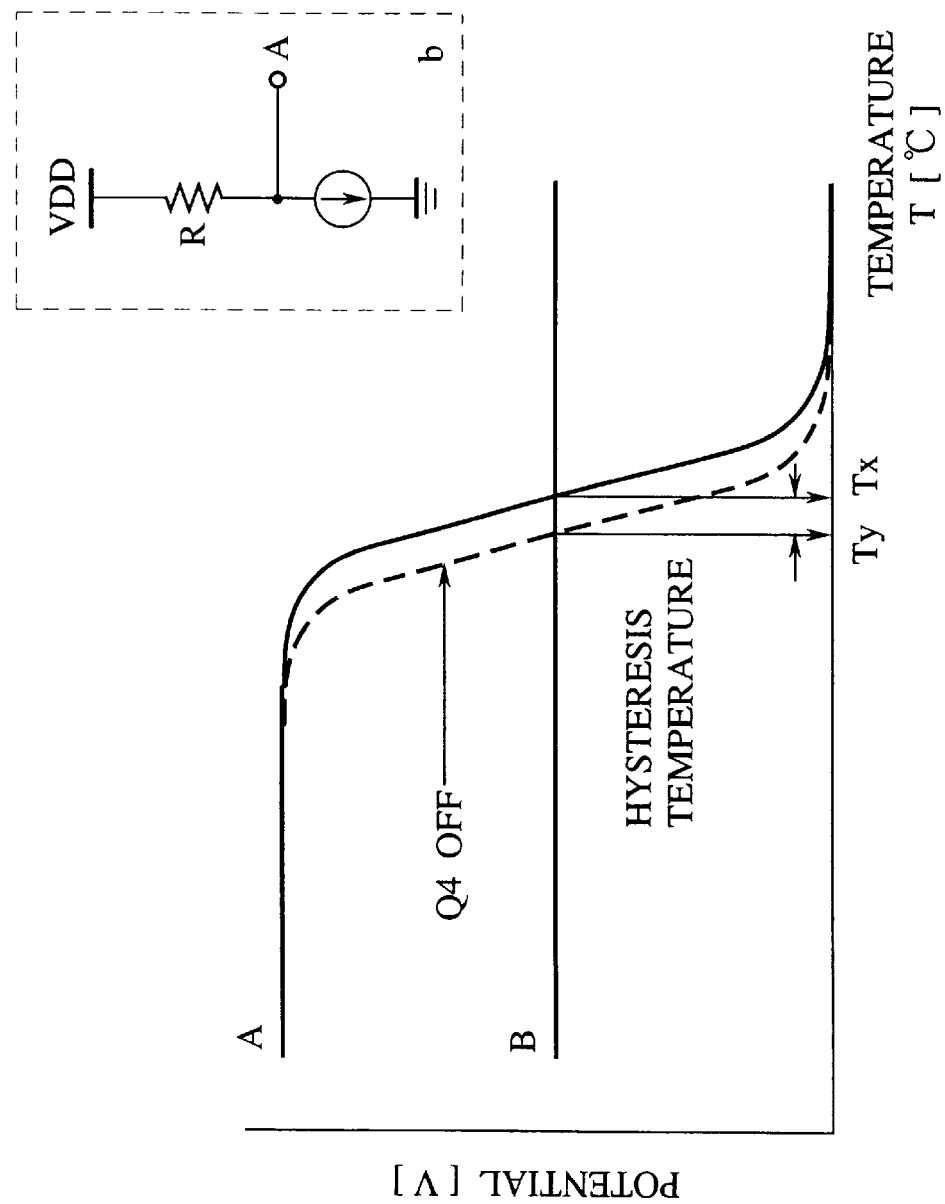
FIG. 9 is a characteristic view showing temperature dependence of potential at respective portions of the temperature sensor according to the third embodiment of the present invention.

In the second embodiment, as the result of attaching the hysteresis circuit to the circuit in which normally the scatter of the characteristics due to the scatter in manufacturing is small, the result that new scatter generating factors are increased has been produced. In a third embodiment of the present invention, such above disadvantage will be eliminated. A temperature sensor according to the third embodiment will be explained with reference to FIGS. 8A, 8B, 9. FIG. 8A is a circuit diagram showing the temperature sensor according to the third embodiment. FIG. 8B is a plan view showing the temperature sensor according to the third embodiment. FIG. 9 is a characteristic view showing temperature dependence of potential at respective portions of the temperature sensor according to the third embodiment.

First, a circuit configuration will be explained with reference to FIG. 8A. The temperature sensor according to the third embodiment comprises the MOSFETs Q1, Q4, the first and second leakage paths 131, 132 generated by constructing the MOSFETs Q1, Q4, the first and second resistors R4, R5, and the comparator 166. As similar substantially to the first embodiment, a sectional structure of the third embodiment is formed on the first conductivity type semiconductor substrate. However, the temperature sensor is constructed by use of single MOSFET in the first embodiment, but the temperature sensor is constructed by use of two MOSFETs Q1, Q4 in the third embodiment. More particularly, as shown in the plan view of FIG. 8B, the temperature sensor according to the third embodiment of the present invention comprises a second conductivity type first semiconductor region (first n$^+$ diffusion region) 186 formed on the first conductivity type semiconductor substrate (p type substrate), and a second conductivity type second semiconductor region (second n$^+$ diffusion region) 187 formed on the semiconductor substrate. Alternatively, a first n$^+$ diffusion region 186 and a second n$^+$ diffusion region 187 may be formed on the p well on the n type substrate. The first semiconductor region 186 and the second semiconductor region 187 are formed to oppose to each other at a first opposing area and a second opposing area provided at different location from the first opposing area on the planar pattern. A gate insulating film is formed on the semiconductor substrate between the first semiconductor region 186 and the second semiconductor region 187. The first gate electrode layer (polysilicon gate layer) 185 is formed on the gate insulating film at the first opposing area. The second gate electrode layer 184 is formed on the gate insulating film at the second opposing area. The first gate electrode layer 185 can act as a gate electrode of the MOSFET Q1 whose drain region consists of the first semiconductor region 186 and whose source region consists of the second semiconductor region 187. The second gate electrode layer 184 can act as a gate electrode of the MOSFET Q4 whose drain region consists of the first semiconductor region 186 and whose source region consists of the second semiconductor region 187.

Like FIG. 3A, the temperature sensor according to the third embodiment of the present invention comprises an insulating layer (interlayer insulating layer) formed on the semiconductor substrate as well as on the first gate electrode layer 185 and the second gate electrode layer 184. As shown in the plan view of FIG. 8B, a first contact hole 173 is formed on the first semiconductor region 186 by removing a part of the interlayer insulating layer to expose the first semiconductor region 186. Similarly, a plurality of second contact holes 183 are formed on the second semiconductor region 187 by removing a part of the interlayer insulating layer, third contact holes 174 is formed on the first gate electrode layer 185, and fifth contact holes 175 are formed on the second gate electrode layer 184. Although their illustration is omitted (see FIG. 3A), the first conductivity type high impurity concentration contact region ($p^+$ diffusion region) is also provided on the semiconductor substrate and a fourth contact hole is formed on the contact region. The contact region and the first power supply (GND) are connected by the third wiring via the fourth contact hole. The first wiring (Al wiring layer) 181 connects the first semiconductor region 186 and the first gate electrode layer 185 via the first contact hole 173 and the third contact holes 174, and also connects them to the second power supply (VDD). The second semiconductor region 187 and a positive side input terminal (+) of the comparator 166 are connected mutually by the second wiring (Al wiring layer) 182 via the plurality of second contact holes 183. The output of the comparator 166 and the second gate electrode layer 184 are connected mutually by the fourth wiring (Al wiring layer) 180. The operation region of the MOSFET Q1 is set to the saturation region by connecting the gate electrode layer 185 and the drain region 186 of the MOSFET Q1 via the first wiring 181. The leakage path 131 is formed between the first semiconductor region 186 and the semiconductor substrate, and the leakage path 132 is formed between the second semiconductor region 187 and the semiconductor substrate. In addition, potential of the second power supply (VDD) is set high rather than potential of the first power supply (GND). Operation and effectiveness of respective regions in the plan view are similar to those shown in the first embodiment. The polysilicon gates 184, 185 are arranged in parallel and separately at a predetermined distance along the direction from the $n^+$ diffusion region 186 to the $n^+$ diffusion region 187 (or vice versa).

Therefore, if the temperature sensor according to the third embodiment of the present invention will be explained as an equivalent circuit, such temperature sensor comprises at least a first transistor Q1, a second transistor Q4 connected in parallel to the first transistor Q1, the first leakage path 131 connected to the drain electrode of the first transistor Q1, the second leakage path 132 connected to the source electrode of the first transistor Q1, the first resistor R4 connected to the second power supply (VDD), the second resistor R5 connected to the first resistor R4, and the comparator 166. The comparator 166 has a negative side input terminal (−) which receives potential at a connection point between the first resistor R4 and the second resistor R5 (potential at the point B) and a positive side input terminal (+) which receives potential of the source electrode of the first and second transistors Q1 and Q4 (potential at the point A). The substrate of the first transistor Q1 is connected to the first power supply (GND), and the gate electrode and the drain electrode thereof are connected to the second power supply (VDD). Similarly, the substrate of the second transistor Q4 is connected to the first power supply (GND), the drain electrode thereof is connected to the second power supply (VDD), the source electrode thereof is connected to the source electrode of the first transistor Q1, and the gate electrode thereof is connected to the output side of the comparator 166.

Next, using temperature dependence of potential at respective portions of the circuit shown in FIG. 9, an operation of the temperature sensor will be explained hereunder. At first, behavior of potential at the point B will be explained. Assume that VDD supplied to this circuit has no dependence upon the semiconductor substrate temperature. Potential at the point B has no dependence upon the semiconductor substrate temperature and the value is decided by the resistors R4, R5. Then, behavior of potential at the point B will be explained. First, if the output of the comparator 166 is assumed to "H" as an initial state (where the temperature of the semiconductor substrate is low), the MOSFET Q4 is turned on. Behavior of potential when the temperature of the semiconductor substrate rises is quite similar to that in the first embodiment. Potential at the point A is lowered when the temperature of the semiconductor substrate further rises, and then the output of the comparator 166 is changed from "H" level to "L" level when the A point potential intersects with the B point potential. Therefore, it can be found that the temperature of the semiconductor substrate reaches the previously set detected temperature Tx. At that time, in response to the output of the comparator 166, the MOSFET Q4 is turned off and resultant resistances across the MOSFETs Q1, Q4 are increased.

The "a" portion enclosed with a broken line in FIG. 8A can be depicted as the "b" portion in FIG. 9. The MOSFETs Q1, Q4 can be replaced with an equivalent resistor "R" in the "b" portion enclosed with the broken line. Since the leakage current value can be kept substantially constant regardless of the voltage applied therebetween, the leakage path 132 can be replaced with a constant current source (where its absolute value has the temperature dependence) in the "b" portion. If the temperature dependence of the leakage current values of the leakage paths 131, 132 and the absolute values thereof are supposed as certain constant values (source electrodes of the MOSFETs Q1, Q4 are commonly used to give the same absolute value), the MOSFET Q4 is turned off to thus increase the value of the equivalent resistor "R" so that potential at the point A becomes low rather than that when the MOSFET Q4 is in a conductive state. That is, the temperature dependence of potential at the point A will be represented by the characteristic shown in the broken line in FIG. 9. As a consequence, the point at which the output of the comparator is changed as the temperature of the semiconductor substrate falls down is defined as "the return temperature Ty", so that the hysteresis characteristic can be given to the temperature detection output.

As described above, scatter of potential at the point A due to the scatter in manufacturing process is small and there exists no leakage path at the point B. Even if the hysteresis circuit is attached, scatter of the detected temperature Tx and the return temperature Ty due to the scatter in manufacturing process can be made smaller than the above embodiments. In addition, since the hysteresis circuit can be accomplished by adding one MOSFET Q4 to the first embodiment, a chip area of the temperature sensor can be miniaturized rather than the second embodiment.

Fourth Embodiment

Figure 10:
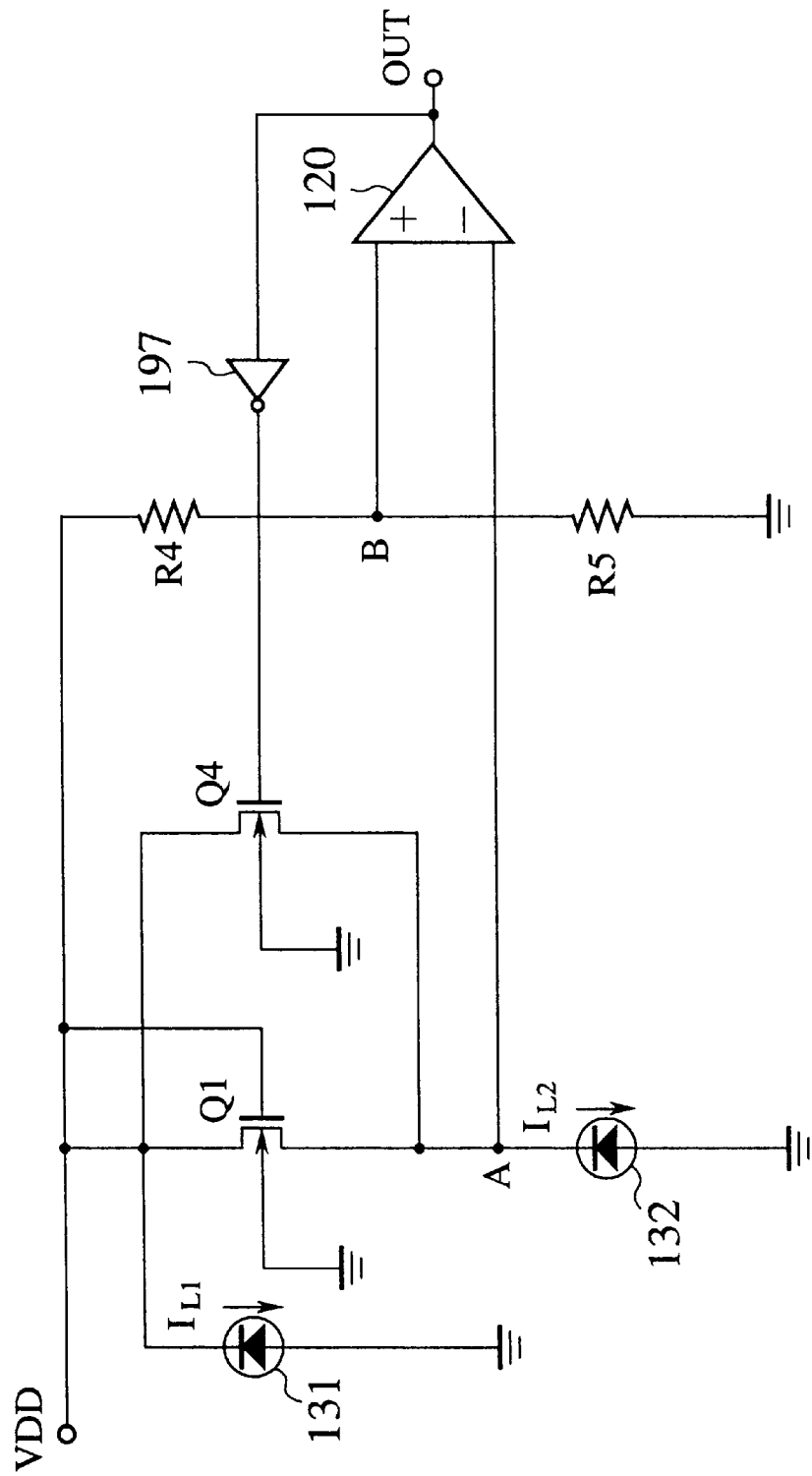
FIG. 10 is a circuit diagram showing a temperature sensor according to a fourth embodiment of the present invention.

Subsequently, a temperature sensor according to a fourth embodiment of the present invention will be explained. FIG. 10 is a circuit diagram showing the temperature sensor according to the fourth embodiment. As shown in FIG. 10, the temperature sensor according to the fourth embodiment comprises the first and second MOSFETs Q1, Q4, the first and second leakage paths 131, 132 generated by constructing the MOSFETs Q1, Q4, the first resistor R4, the second resistor R5, the comparator 120, and the inverter 197 connected between the gate electrode of the second MOSFET Q4 and the output side of the comparator 196. Like FIG. 8B, the first semiconductor region and the second semiconductor region, though omitted from the plan view, are opposed to each other at the first opposing area and the second opposing area. The gate insulating film is formed on the semiconductor substrate between the first semiconductor region and the second semiconductor region, the first gate electrode layer is formed on the gate insulating film at the first opposing area, and the second gate electrode layer is formed on the gate insulating film at the second opposing area. The inverter 197 is connected between the second gate electrode layer of the second MOSFET Q4 and the output side of the comparator 120.

In other words, the temperature sensor according to the fourth embodiment of the present invention includes a parallel circuit consisting of the first transistor Q1 whose substrate is connected to the first power supply (GND) and whose gate electrode and drain electrode are connected to the second power supply (VDD), and the second transistor Q4 whose substrate is connected to the first power supply (GND) and whose drain electrode is connected to the second power supply (VDD), and whose source electrode is connected to the source electrode of the first transistor Q1. In addition, the temperature sensor comprises the first leakage path 131 connected to the drain electrode, the second leakage path 132 connected to the source electrode of the first transistor Q1, the first resistor R4 connected to the second power supply (VDD), the second resistor R5 connected to the first resistor R4, the comparator 120 having a positive side input terminal (+) which receives potential at a connection point between the first resistor R4 and the second resistor R5 (potential at the point B) and a negative side input terminal (−) which receives potential of the source electrode (potential at the point A). An inverter 197 is connected between the gate electrode of the second transistor Q4 and the output side of the comparator 120. The difference of the fourth embodiment from the third embodiment resides in that the temperature detection pattern is opposite. That is, when the temperature of the semiconductor substrate comes up to the detected temperature, the output of the comparator 120 (temperature detection output) is changed from "L" to "H". Further, in the third embodiment, potential at the connection point between the first resistor R4 and the second resistor R5 is input into the negative side input terminal of the comparator 166 while potential at the point A on the second wiring is input into the positive side input terminal of the comparator 166. On the contrary, in the fourth embodiment, potential at the connection point between the first resistor R4 and the second resistor R5 is input into the positive side input terminal of the comparator 120 while potential at the point A on the second wiring is input into the negative side input terminal of the comparator 120. Remaining operations and advantages are similar to those of the third embodiment.

Moreover, in the first to fourth embodiments, the case has been explained where the n type semiconductor region (diffusion region) is formed on the p type substrate to be used as the leakage path. However, it is needless to say that the present invention can be applied to the case where the first and second p type semiconductor regions (diffusion regions) are formed on the n type substrate to be used as the leakage paths, which is opposite to the above case. In this case, potential of the second power supply to which the first p type semiconductor region (diffusion region) is connected via the first wiring may be set lower than that of the first power supply to which the n type substrate is connected via the third wiring.

Fifth Embodiment

Next, a temperature sensor according to a fifth embodiment will be explained hereunder. In the first to fourth embodiments explained above, it has been checked whether or not the temperature of the semiconductor substrate (referred to as a "chip temperature" hereinafter) is above or below one certain set temperature (referred to as a "detected temperature" hereinafter), i.e., only two chip temperature states or temperature ranges have been checked. In the fifth embodiment, a plurality of detected temperatures are set and a plurality of chip temperature states will be checked.

Figure 11:
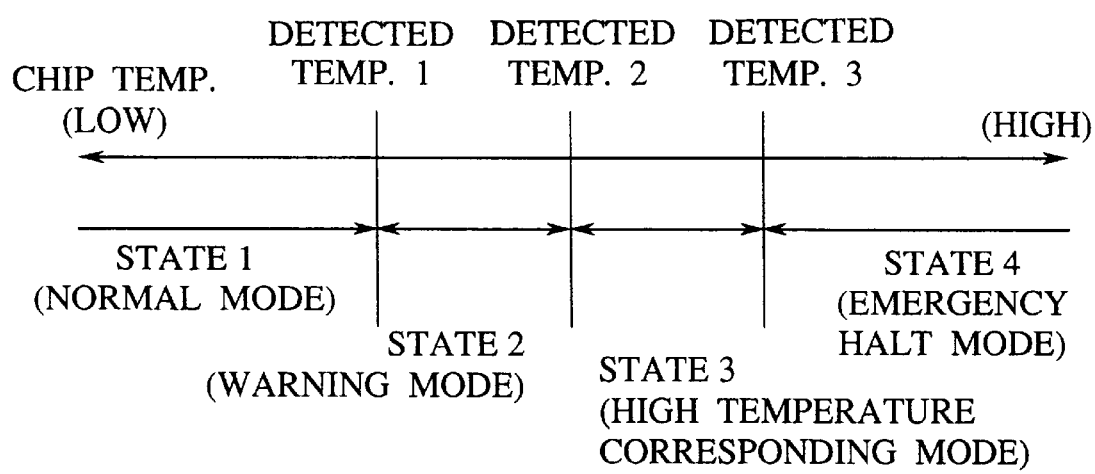
FIG. 11 is a sketch showing a plurality of detected temperatures and respective temperature states (modes) corresponding to the detected temperatures.

First, effectiveness for checking a plurality of chip temperature states will be discussed. A temperature sensor will be discussed hereinbelow in which three detected temperatures are set and four chip temperature states (modes) are checked. If it is checked whether or not the chip temperature is above or below three detected temperatures respectively, four chip temperature states can be defined as shown in FIG. 11. More particularly, a temperature state 1 is below a detected temperature 1, a temperature state 2 is more than or equal to the detected temperature 1 and below a detected temperature 2, a temperature state 3 is more than or equal to the detected temperature 2 and below a detected temperature 3, and a temperature state 4 is more than or equal to the detected temperature 3. If overall operation of the IC chip is previously defined in four chip temperature states respectively, for example, optimal control of such overall operation of the IC chip can be effected according to the chip temperature state in the following.

1. Temperature state 1=normal mode=>normal operation.

2. Temperature state 2=warning mode=>Be careful since the chip temperature is slightly higher. Shift to the high temperature corresponding mode will be also prepared.

3. Temperature state 3=high temperature corresponding mode=>A chip operation speed is lowered to reduce the chip temperature, for example, since the chip temperature rises.

4. Temperature state 4=emergency halt mode=>Main functions are halted since the chip temperature is increased abnormally.

If a plurality of chip temperature states can be grasped as discussed above, the overall operation of the IC chip can be controlled according to the chip temperature states, so that improvement in the fail-safe function of the IC chip can be derived, etc.

Figure 12A:
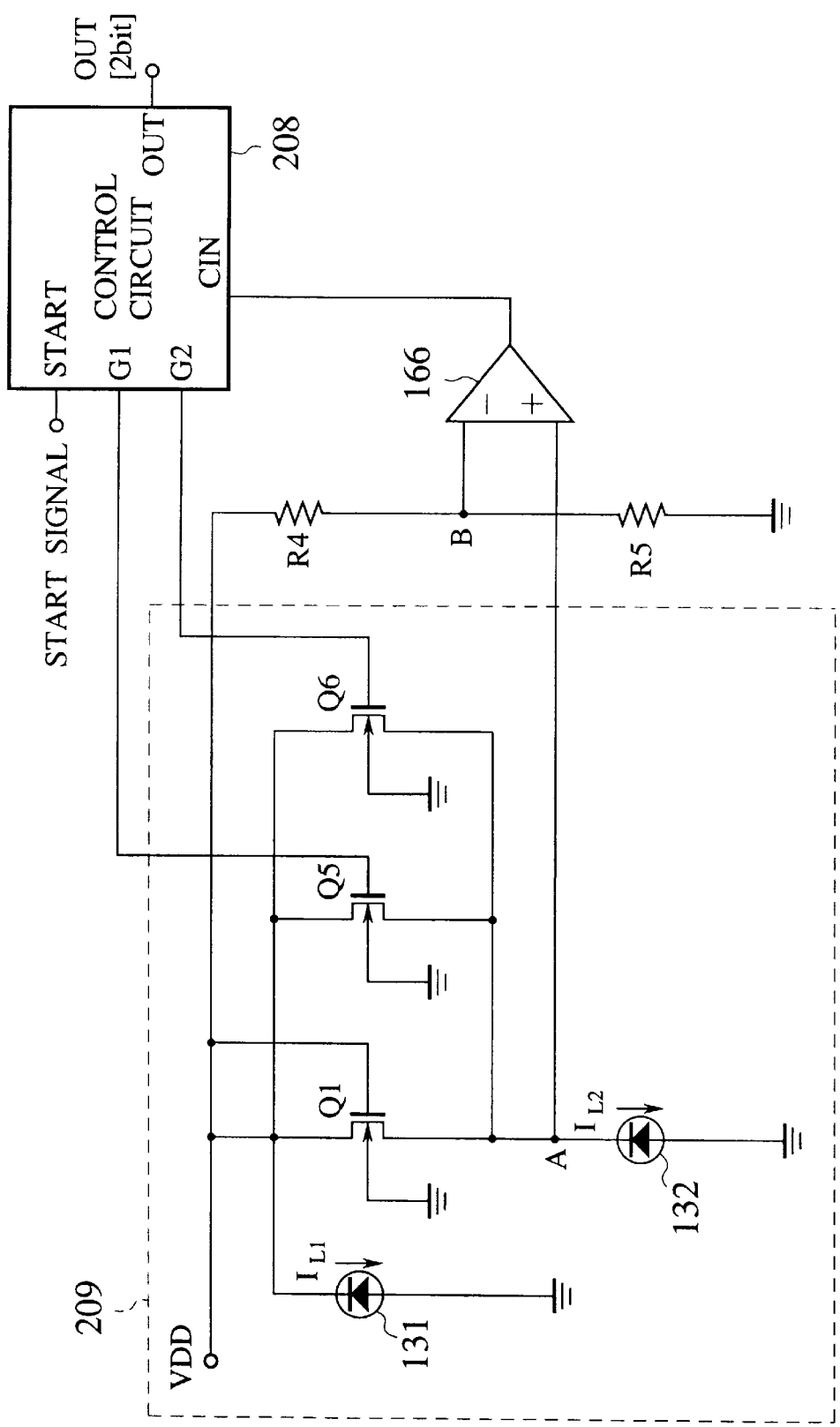
FIG. 12A is a circuit diagram showing a temperature sensor according to a fifth embodiment of the present invention.
Figure 12B:
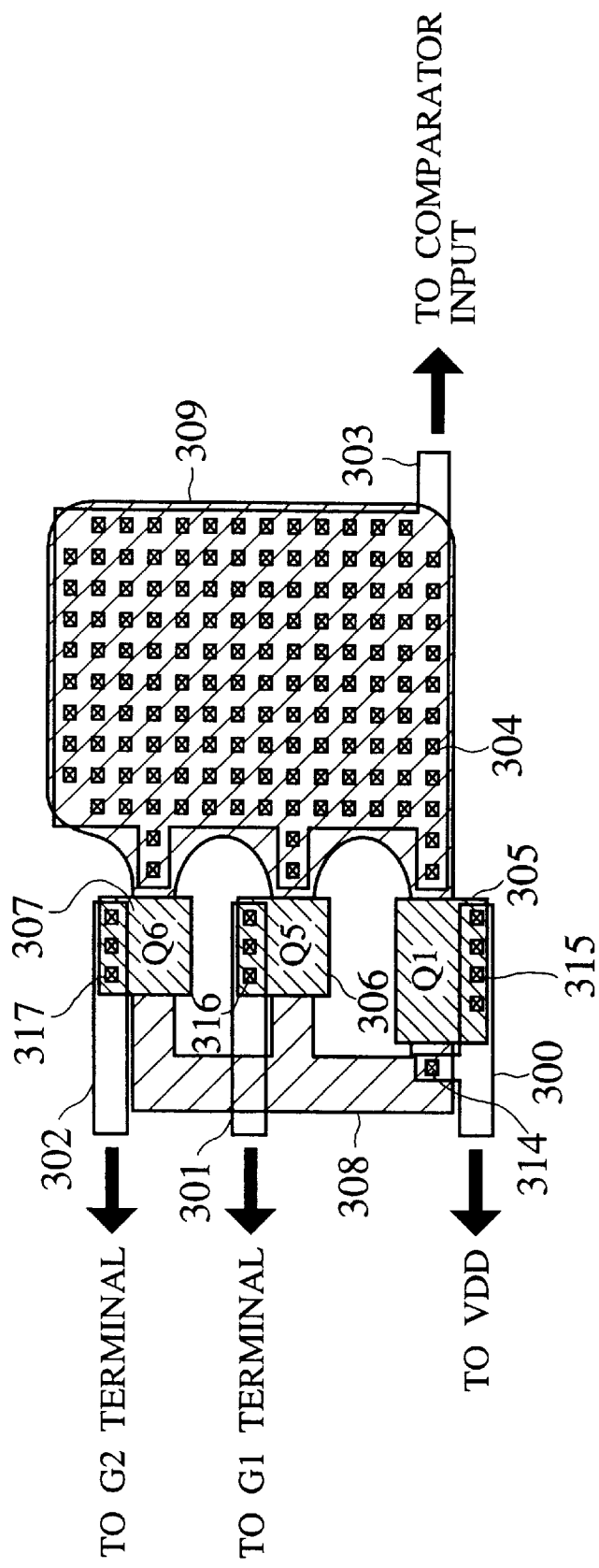
FIG. 12B is a plan view showing the temperature sensor according to the fifth embodiment of the present invention.
Figure 13:
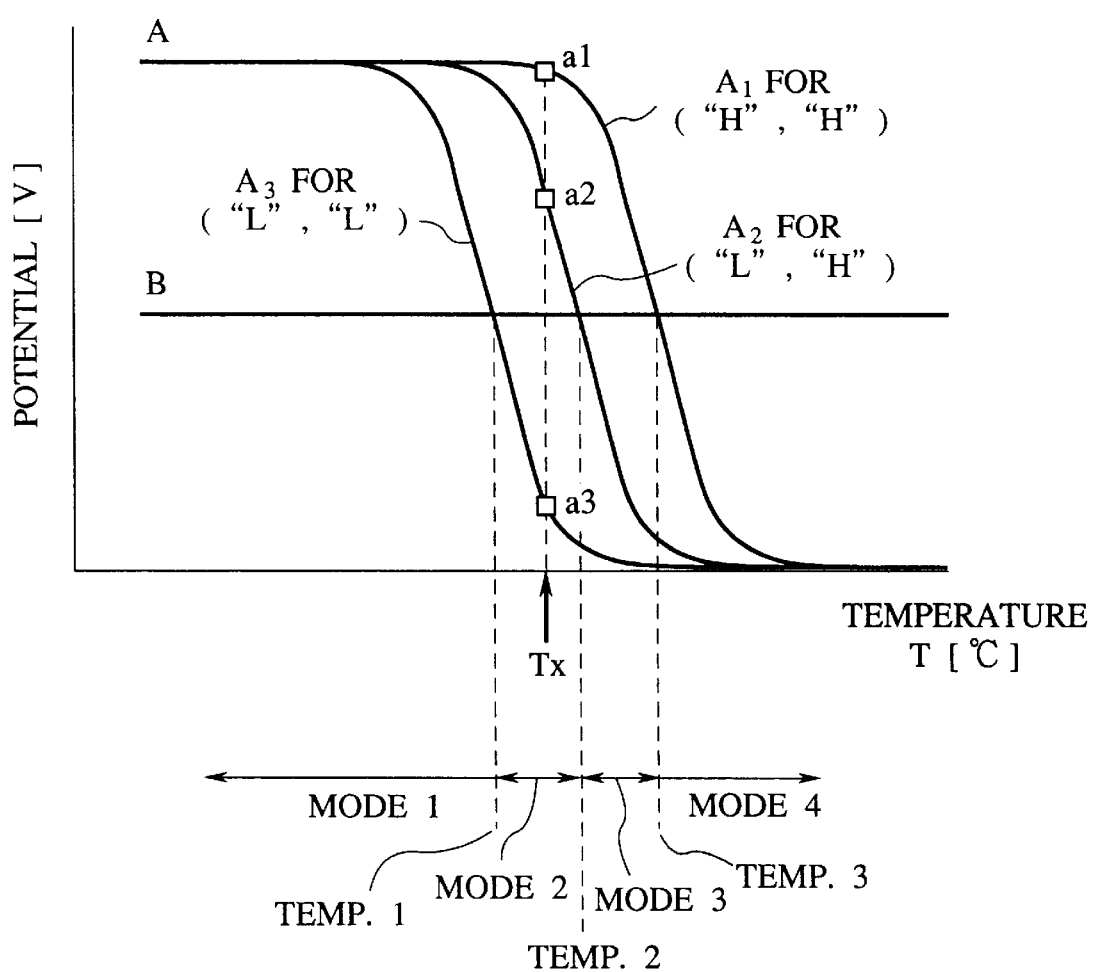
FIG. 13 is a characteristic view showing temperature dependence of potential at respective portions of the temperature sensor according to the fifth embodiment of the present invention.

FIG. 12A is a circuit diagram showing a temperature sensor according to the fifth embodiment. FIG. 12B is a plan view showing the temperature sensor according to the fifth embodiment. FIG. 13 is a characteristic view showing temperature dependence of potential at respective portions of the temperature sensor according to the fifth embodiment. First of all, a circuit configuration will be explained with reference to FIG. 12A. The fifth embodiment of the present invention comprises a first transistor (MOSFET Q1), a second transistor (MOSFET Q5) and a third transistor (MOSFET Q6), leakage paths 131, 132 generated by constructing these MOSFETs Q1, Q5, Q6, a first resistor R4 and a second resistor R5, a comparator 166, and a control circuit (temperature sense control circuit) 208. The temperature sense control circuit 208 has a first output terminal (control output terminal) G1 and a second output terminal (control output terminal) G2. A portion enclosed with a broken line is a MOS portion 209 whose plan view is shown in FIG. 12B. A sectional structure of the MOS portion 209 in FIG. 12 is substantially similar to those of the first to fourth embodiments. However, the fifth embodiment of the present invention is different in that three MOSFETs Q1, Q5, Q6 are formed. In FIG. 12B, a first semiconductor region (first n$^+$ diffusion region) 308 and a second semiconductor region (second n$^+$ diffusion region) 309 are opposed to each other at three opposing areas, i.e., a first opposing area, a second opposing area which is provided on the planar pattern at different position from the first opposing area, and a third opposing area which is provided on the planar pattern at different position from the first opposing area and the second opposing area. The first n$^+$ diffusion region 308 and the second n$^+$ diffusion region 309 are formed on the p type substrate. Alternatively, the first n$^+$ diffusion region 308 and the second n$^+$ diffusion region 309 may be formed on the p well in the n type substrate. A gate electrode layer (first gate electrode layer) 305 is formed on the first opposing area, a second gate electrode layer 306 which is independent from the first gate electrode layer 305 is formed on the second opposing area, and a third gate electrode layer 307 which is independent from the first gate electrode layer 305 and the second gate electrode layer 306 is formed on the third opposing area. The first gate electrode layer 305, the second gate electrode layer 306, and the third gate electrode layer 307 correspond to gate electrodes of the MOSFET Q1, the MOSFET Q5, and the MOSFET Q6 respectively.

Like FIG. 3A, the temperature sensor according to the fifth embodiment of the present invention has an insulating layer (interlayer insulating layer) formed on the semiconductor substrate and the first to third gate electrode layers 305, 306, 307. As shown in the plan view of FIG. 12B, a first contact hole 314 is formed on the first semiconductor region 308 by removing a part of the interlayer insulating layer to expose the first semiconductor region 308. Similarly, a plurality of second contact holes 304 are formed on the second semiconductor region 309 by removing a part of the interlayer insulating layer. Also, a plurality of third contact holes 315 are formed on the first gate electrode layer 305, a plurality of fifth contact holes 316 are formed on the second gate electrode layer 306, and a plurality of sixth contact holes 317 are formed on the third gate electrode layer 307. Although not depicted (see FIG. 3A), a first conductivity type high impurity concentration contact region (p$^+$ diffusion region) is provided on the semiconductor substrate, and a fourth contact hole is arranged on the contact region. The contact region and the first power supply (GND) are connected by the third wiring via the fourth contact hole. The first wiring (Al wiring layer) 300 connects the first semiconductor region 308 and the first gate electrode layer 305 via the first contact hole 314 and the third contact holes 315, and is also extended to connect them to the second power supply (VDD). The first output terminal (control output terminal) G1 of the temperature sense control circuit 208 and the second gate electrode layer 306 are connected by the fourth wiring 301 via the fifth contact holes 316. The second output terminal (control output terminal) G2 of the temperature sense control circuit 208 and the third gate electrode layer 307 are connected by the fifth wiring 302 via the sixth contact holes 317. The second semiconductor region 309 and a positive side input terminal (+) of the comparator 166 are connected by the second wiring (Al wiring layer) 303 via a plurality of second contact holes 304.

Next, an overall operation of the temperature sensor will be explained with reference to the circuit diagram in FIG. 12A and the temperature dependence of potential at respective portions of the circuit shown in FIG. 13. First, when a START SIGNAL is input into a temperature sense start signal terminal START, the temperature sense control circuit 208 outputs control signals from its control output terminals G1, G2 in accordance with a plurality of operation sequences being previously set. The temperature sense control circuit 208 receives outputs of the comparator 166, which are the results of comparison between the detected temperature set in the plurality of operation sequences and the chip temperature, by its input terminal CIN. Then, the temperature sense control circuit 208 outputs these results as a two-bit temperature detection output, for example, from its decision result output terminal OUT. Output potential levels of the control output terminals G1, G2 are set to VDD or GND. In the following, the VDD level is referred to as "H" and the GND level is referred to as "L". The MOSFET to be controlled by the above operation sequences are the MOSFET Q5 and the MOSFET Q6 except for the MOSFET Q1 as a basic transistor. In general, if the number of MOSFETs is n, the number of control output terminals is n−1. In the fifth embodiment, the case is shown where n=3 and the number of control output terminals is two, i.e., G1 and G2.

Next, behavior of potential at the point A in FIG. 12A will be explained. First, if both the control output terminals G1, G2 are set to "H", both the MOSFETs Q5, Q6 are turned on. When the chip temperature is increased, behavior of potential at the point A is almost similar to those in the first to fourth embodiments. When the chip temperature is low, potential is supplied from VDD to the point A via the MOSFET Q1. When the leakage current $I_{L2}$ is increased via the leakage path 132 with the increase of the temperature, potential at the point A falls down ($A_1$ characteristic in FIG. 13).

Then, if the control output terminal G1 is set to "L" and the control output terminal G2 is set to "H", the MOSFET Q5 is turned off and the MOSFET Q6 is turned on. At that time, resultant resistances across the MOSFETs Q1, Q5, Q6 are increased. Since the leakage current value $I_{L2}$ of the leakage path 132 to decide potential at the point A is substantially constant irrespective of the voltage applied across the leakage path (but its absolute value has the temperature dependence), the A point characteristic becomes the $A_2$ characteristic in FIG. 13, like the third embodiment.

Then, if both the control output terminals G1, G2 are set to "L", both the MOSFETs Q5, Q6 are turned off. Since resultant resistances across the MOSFETs Q1, Q5, Q6 are further increased, the A point characteristic becomes the $A_3$ characteristic in FIG. 13. In this fashion, the temperature dependence of the point A can be shifted by turning the MOSFETs Q5, Q6 on/off.

Next, behavior of potential at the point B will be explained. Assume that VDD supplied to this circuit has no dependence upon the chip temperature, potential at the point B has also no dependence upon the chip temperature so that the value can be decided by the resistors R4, R5.

Next, an operation of the overall circuit will be explained. For example, it is supposed that the chip temperature Tx of the IC chip in which this circuit is built is set to the value indicated by an arrow ↑ in FIG. 13 (value between the detected temperatures 1 and 2) and also potential at the point B is set at a level shown in FIG. 13. When the temperature sense start signal is input into the temperature sense start signal terminal START of the temperature sense control circuit 208 from a control device (e.g., CPU, etc.) for the overall IC chip in which the temperature sensor is built, three operations are executed as follows. In FIG. 13, for the sake of illustration, the normal mode is labeled as a mode 1, the warning mode is labeled as a mode 2, the high temperature corresponding mode is labeled as a mode 3, and the emergency halt mode is labeled as a mode 4.

Operation Sequence 1

"H" is output from the G1 terminal and also "H" is output from the G2 terminal. The temperature dependence of potential at the point A is thus the $A_1$ characteristic, and potential at the point A becomes a1. Therefore, the output of the comparator 120 becomes "L".

Operation Sequence 2

"L" is output from the G1 terminal but "H" is output from the G2 terminal. The temperature dependence of potential at the point A is thus the $A_2$ characteristic, and potential at the point A becomes a2. Therefore, the output of the comparator 120 becomes "L".

Operation Sequence 3

"L" is output from the G1 terminal and also "L" is output from the G2 terminal. The temperature dependence of potential at the point A is thus the $A_3$ characteristic, and potential at the point A becomes a3. Therefore, the output of the comparator 120 becomes "H".

According to the above three operations, since the chip temperature is higher than the detected temperature 1 but lower than the detected temperature 2, it can be decided that the temperature state is the mode 2, i.e., "warning mode". As described, if the operation mode of the IC chip is changed correspondingly, optimal control of the IC chip to monitor the chip temperature can be carried out.

Relationships between outputs C of the comparator 166 and the temperature states (modes) in above three operation sequences are shown in FIG. 14. As shown in FIG. 14, in all operation sequences 1 to 3, if the output C of the comparator 166 is "L", the chip temperature Tx is below the detected temperature 1 and thus the temperature state can be decided as the normal mode. Similarly, if the output C is "H" only in the operation sequence 3, the chip temperature Tx is more than or equal to the detected temperature 1 but below the detected temperature 2 and thus the temperature state can be decided as the warning mode. If the output C is "H" in the operation sequences 2 and 3, the chip temperature Tx is more than or equal to the detected temperature 2 but below the detected temperature 3 and thus the temperature state can be decided as the high temperature corresponding mode. If the output C is "H" in all the operation sequences 1 to 3, the chip temperature Tx is more than or equal to the detected temperature 3 and thus the temperature state can be decided as the emergency halt mode. Based on the operation sequences and the output C of the comparator 166, the temperature sense control circuit 208 can select one of the above four modes and output it. The temperature sense control circuit 208 may be constructed such that it outputs simply the operation sequence and the output C in combination to be used by a control device (e.g., CPU, etc.) provided at the succeeding stage.

Although three MOSFETs are provided and two MOSFETs Q5 and Q6 are used as the MOSFETs to be on/off-controlled in the fifth embodiment, normally (n−1) MOSFETs may be on/off-controlled if n MOSFETs are provided. In order to provide n MOSFETs, n polysilicon gate patterns 305, 306, 307 ... shown in FIG. 12B are provided and then a plurality of contact holes 315, 316, 317 ... are formed on the patterns 305, 306, 307, ..., respectively. As shown in the fifth embodiment of the present invention, more precise temperature detection and control can be executed by providing a number of MOSFETs in parallel.

As explained in the above first to fourth embodiments, according to the fifth embodiment of the present invention, the chip area of the temperature sensor can be reduced the chip area becomes smaller than the circuit shown in FIG. 1A, and the scatter of the detected temperature due to scatter in manufacturing process can be reduced. Also, in the fifth embodiment of the present invention, the temperature sensor having three detection points can be provided by a very simple structure with three MOSFETs Q1, Q5 and Q6, wherein the gate potential of two MOSFETs Q5, Q6 is switched. Therefore, it is evident that the fifth embodiment can achieve a high performance with a smaller chip area, in contrast to the case where a plurality of temperature states are supposed to be detected by the circuit shown in FIG. 1A.

Further, in the fifth embodiment, the case has been explained where the n type semiconductor regions ($n^+$ diffusion regions) are fabricated on the p type substrate and such regions are used as the leakage paths. However, the present invention may be applied to the opposite case where first and second type semiconductor regions ($p^+$ diffusion regions) are fabricated on the n type substrate and such regions are used as the leakage paths. In this case, potential of the second power supply to which the first p type semiconductor region ($p^+$ diffusion region) is connected via the first wiring may be set low rather than potential of the first power supply to which the n type substrate is connected via the third wiring.

In addition, like the third and fourth embodiments, a plurality of detected temperatures can also be provided to the temperature sensor to which a hysteresis function is attached.

Moreover, as set forth in the first to fourth embodiments, similarly the above various configuration can be applied to the fifth embodiment. More particularly, the configuration which is capable of suppressing the electric field concentration at the corner portion, suppressing the deviation of the distribution of the leakage current value, and thus improving the reliability by forming the corner portions of the second $n^+$ diffusion region 309 as rounded or polygonal shapes can be applied to the firth embodiment. Further, the configuration which is capable of reducing the contact resistance between the source regions of the MOSFETs and the wirings and suppressing influence of the scatter of the resistance values due to the scatter in manufacturing process by forming a plurality of second contact holes 304 on the substantially whole surface of the second $n^+$ diffusion region 309, the configuration which is capable of increasing the resistance at the corner portions to thus suppress the electric field concentration and improving the reliability by reducing the number of contact holes at the corner portions of the second $n^+$ diffusion region 309 rather than other portions, etc., can be applied to the fifth embodiment.

Sixth Embodiment

In turn, a temperature sensor according to a sixth embodiment of the present invention will be explained. The temperature state is checked at certain single location in the IC chip in the first to fifth embodiments, whereas the temperature states are checked at plural locations in the IC chip in the sixth embodiment of the present invention.

First, effectiveness to grasp the temperature states at plural locations in the IC chip will be explained. With regard to heating process in the IC chip, the overall IC chip is not uniformly heated, but heat is generated due to any cause at a certain particular portion (one location or plural locations) and then such heat spreads over the whole IC chip as the elapse of time. If only one temperature sense portion is provided and heat is generated at a location which is remote from the temperature sense portion, a certain time is needed until such heat can be detected. On the contrary, if plural temperature sense portions are provided in the IC chip, a period of time necessary for detection can be shortened rather than the case where only one temperature sense portion is provided even if heat is generated in any location of the IC chip. It is needless to say that, if viewed from an aspect of the reliability of the IC chip, such fail-safe operation is effective to be executed as soon as possible.

Figure 15A:
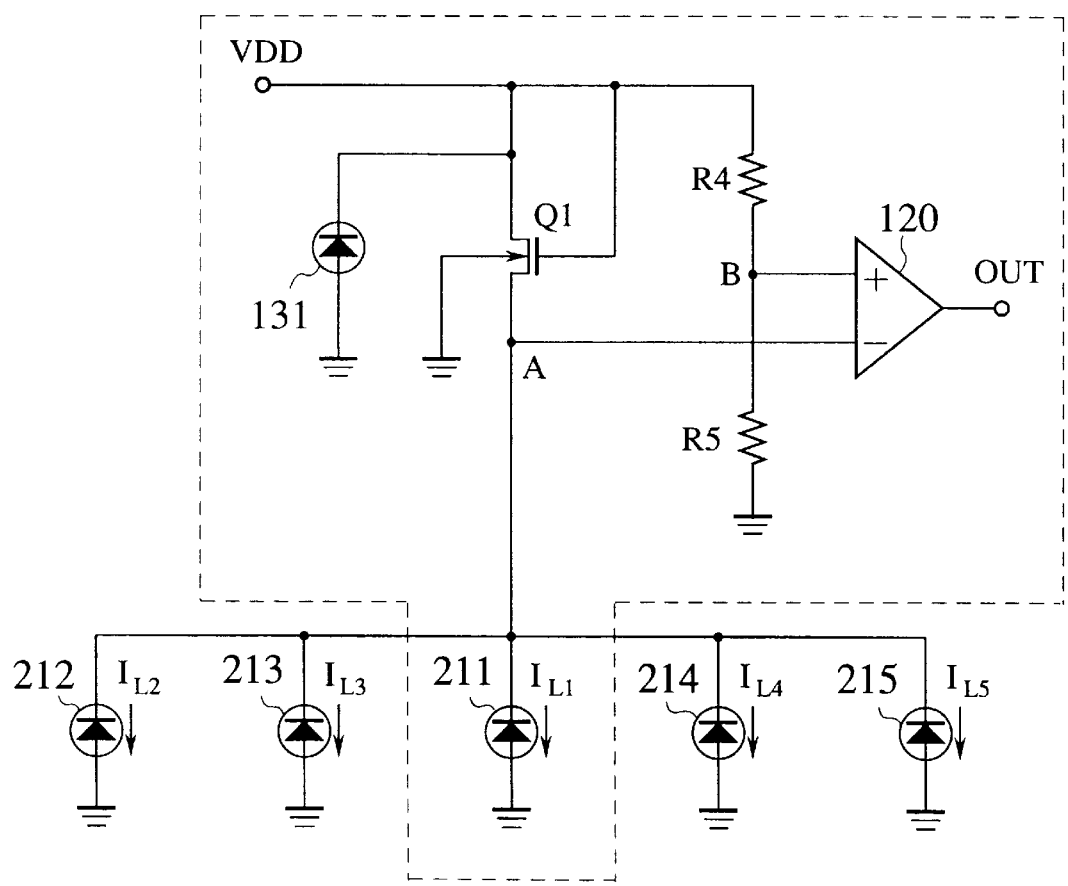
FIG. 15A is a circuit diagram showing a temperature sensor according to a sixth embodiment of the present invention.
Figure 15B:
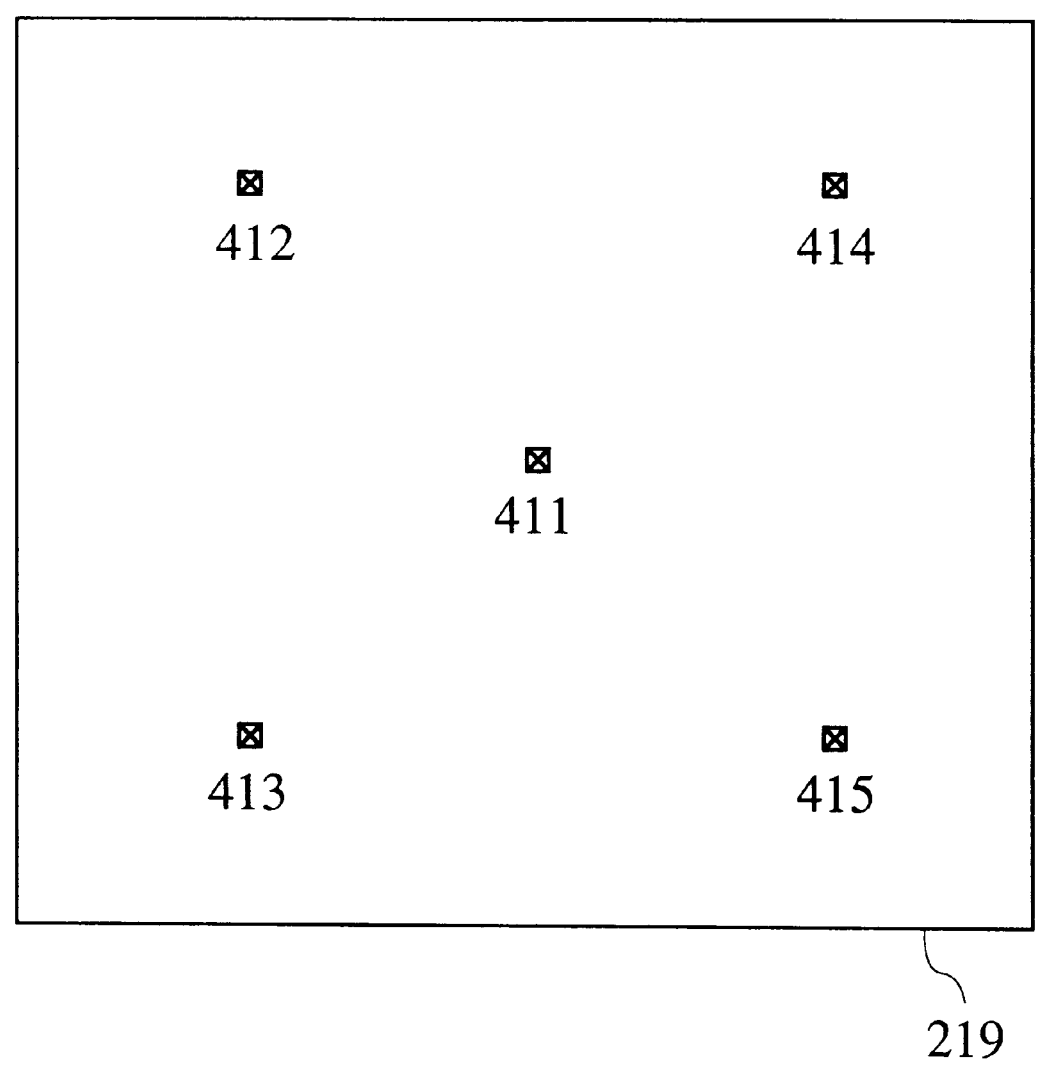

The sixth embodiment will be explained with reference to FIGS. 15A and 15B. In the sixth embodiment of the present invention, the case is illustrated where five temperature sense portions are provided. FIG. 15A is a circuit diagram showing the temperature sensor according to the sixth embodiment. FIG. 15B is a plan view showing an example of an arrangement of a plurality of temperature sense portions 411 to 415, i.e., leakage paths in the temperature sensor according to the sixth embodiment.

The temperature sensor according to the sixth embodiment of the present invention comprises at least the MOSFET Q1, the leakage paths 131, 211 generated by constructing the MOSFET Q1, leakage paths 212 to 215 provided separately from the leakage path 211, the first resistor R4, the second resistor R5, and the comparator 120. The potential level discriminator is composed of the first resistor R4, the second resistor R5, and the comparator 120. The portion enclosed with a broken line in FIG. 15A is the same circuit in the first embodiment. In other words, as in FIGS. 3A and 3B, the portion comprises the second conductivity type first semiconductor region (first n$^+$ diffusion region) formed on the IC chip 219 made of the first conductivity type semiconductor substrate (p type substrate), the second conductivity type second semiconductor region (second n$^+$ diffusion region) 411 formed on the semiconductor substrate, the gate insulating film formed on the semiconductor substrate between the first semiconductor region and the second semiconductor region 411, the gate electrode layer (polysilicon gate layer) formed on the gate insulating film, the biasing means for connecting the semiconductor substrate to the first power supply (GND) to bias the semiconductor substrate to predetermined potential, the first wiring (Al wiring layer) for connecting the first semiconductor region and the gate electrode layer and then connecting them to the second power supply (VDD), and the potential level discriminator (R4, R5, 120) connected to the second semiconductor region 411 through the second wiring (Al wiring layer). The leakage path 131 is formed between the first semiconductor region and the semiconductor substrate, while the leakage path 211 is formed between the second semiconductor region 411 and the semiconductor substrate. In the sixth embodiment of the present invention, four second conductivity type third semiconductor region (third n$^+$ diffusion region) 412, 413, 414, 415 are formed on the IC chip (semiconductor substrate) 219 as the temperature sense portions. Leakage paths 212, 213, 214, 215 are formed between the third n$^+$ diffusion regions 412, 413, 414, 415 and the semiconductor substrate. Each of the leakage paths 212, 213, 214, 215 has a shape like the second n$^+$ diffusion region 32 in FIG. 3B, for example. As shown in FIG. 15A, the leakage paths 212, 213, 214, 215 are formed associated with the third n$^+$ diffusion region 412, 413, 414, 415 on the IC chip 219 respectively and connected by branch wirings such as Al wirings, etc. A whole pattern shown in FIG. 3B (i.e., portions of the MOSFET Q1 and the leakage path 211 in FIG. 15A), for example, is formed in the peripheral area of the second semiconductor region 411 in FIG. 15B. The plurality of third semiconductor regions 412 to 415 and the second semiconductor region (second n$^+$ diffusion region) are connected by the branch lines respectively.

Next, an operation of the circuit will be explained. It is assumed that VDD supplied to this circuit has no dependence upon the chip temperature and therefore potential at the point B has no dependence upon the chip temperature. A basic operation is substantially similar to that in the first embodiment. First, it is supposed that heat generation occurs near the leakage path 211. Then, the leakage current flows via the leakage path 211 and thus potential at the point A is decreased in level. When potential at the point A becomes lower than potential at the point B, the output potential level of the comparator 120 is changed ("L"→"H"). The similar operation is executed when heat is generated near other leakage paths. In other words, even if heat generation occurs at any location in the IC chip, such heat generation can be detected quicker than the case where only one temperature sense portion is provided.

As stated above, in the sixth embodiment of the present invention, in addition to such an advantage that the detected temperature scattering due to the scatter in manufacturing process can be reduced, to provide a plurality of temperature sense portions can be accomplished by a very simple configuration such that the leakage paths 212 to 215 are formed by providing plural third n$^+$ diffusion regions 412 to 415 and then connecting to the MOSFET Q1 by means of the wirings. The detection time can be shortened rather than the case where only one temperature sense portion is provided to lead to an Improvement in the reliability of the IC chip. Though the temperature sensor having five temperature sense portions has been explained in the sixth embodiment, it is needless to say that less than four or more than six temperature sense portions may also be applicable. Though the case has been explained in the sixth embodiment where the n type semiconductor regions (n$^+$ diffusion regions) 411 to 415 are fabricated on the p type substrate and then used as the leakage paths, the present invention can be applied to the opposite case where the p type semiconductor regions (p$^+$ diffusion regions) are fabricated on the n type substrate and then used as the leakage paths.

In the temperature sensor to which the hysteresis function is added, like the third and fourth embodiments, and the temperature sensor to which plural detected temperature are provided, like the fifth embodiment, functions in the sixth embodiment can be accomplished by providing the similar leakage paths at plural locations on the IC chip.

By forming the corner portions of the second n$^+$ diffusion region 411 and the third n$^+$ diffusion regions 412 to 415 as rounded or polygonal shapes, the electric field concentration at the corner portion and the deviation of the distribution of the leakage current value can be suppressed, whereby the reliability can be improved. By forming a plurality of contact holes on the substantially whole surface of the second and third n$^+$ diffusion region 411 to 415, the contact resistance between the source regions of the MOSFETs and the wirings can be reduced and also influence of the scatter of the resistance values due to the scatter in manufacturing process can be suppressed. By reducing the number of contact holes at the corner portions of the second and third n+ diffusion regions 411 to 415 rather than other portions, etc., the resistance at the corner portions can be increased to thus suppress the electric field concentration, whereby the reliability can be improved.

Various modifications will become possible for those skilled in the art after receiving the teachings of the present disclosure without departing from the scope thereof.

What is claimed is:

1. A semiconductor temperature sensor comprising:
   (a) a semiconductor substrate of first conductivity type;
   (b) a first semiconductor region of second conductivity type formed on the semiconductor substrate;
   (c) a second semiconductor region of second conductivity type formed on the semiconductor substrate;
   (d) a gate insulating film formed on the semiconductor substrate between the first semiconductor region and the second semiconductor region;
   (e) a gate electrode layer formed on the gate insulating film;
   (f) means for biasing the semiconductor substrate to a predetermined potential by connecting the semiconductor substrate to a first power supply;
   (g) a first wiring for connecting the first semiconductor region and the gate electrode layer mutually and connecting the first semiconductor region and the gate electrode layer to a second power supply; and
   (h) a potential level discriminator connected to the second semiconductor region via a second wiring;
   wherein a temperature sense output is provided by an output of the potential level discriminator.

2. The sensor of claim 1, wherein the potential level discriminator comprises,
   a first resistor connected to the second power supply,
   a second resistor connected to the first resistor, and
   a comparator having one input terminal which receives a potential at a connection point between the first resistor and the second resistor and another input terminal which receives a potential at the second wiring.

3. The sensor of claim 1, further comprising:
   an insulating layer formed on the semiconductor substrate and the gate electrode layer;
   a first contact hole arranged on the first semiconductor region;
   a plurality of second contact holes arranged on the second semiconductor region; and
   a third contact hole arranged on the gate electrode layer;
   wherein the first wiring connects the first semiconductor region and the gate electrode layer to the second power supply via the first contact hole and the third contact hole, and
   the second wiring connects the second semiconductor region to the potential level discriminator via the plurality of second contact holes.

4. The sensor of claim 1, wherein the biasing means comprises,
   a high impurity concentration contact region of first conductivity type formed on the semiconductor substrate,
   a fourth contact hole arranged on the contact region, and
   a third wiring for connecting the contact region to the first power supply via the fourth contact hole.

5. The sensor of claim 1, wherein the first conductivity is p type, the second conductivity is n type, and potential of the second power supply is set higher than that of the first power supply.

6. The sensor of claim 1, wherein the first conductivity is n type, the second conductivity is p type, and potential of the first power supply is set higher than that of the second power supply.

7. A sensor comprising:
   (a) a semiconductor substrate of a first conductivity type;
   (b) a first semiconductor region of a second conductivity type formed on the semiconductor substrate;
   (c) a second semiconductor region of a second conductivity type formed on the semiconductor substrate and configured such that the first semiconductor region and the second semiconductor region are opposed to each other at a first opposing area and a second opposing area is provided at a different position from the first opposing area on a planar pattern;
   (d) a gate insulating film formed on the semiconductor substrate between the first and second semiconductor regions;
   (e) a first gate electrode layer formed on the gate insulating film and provided on the first opposing area;
   (f) a second gate electrode layer provided on the second opposing area independently of the first gate electrode layer;
   (g) means for biasing the semiconductor substrate to a predetermined potential by connecting the semiconductor substrate to a first power supply;
   (h) a first wiring for connecting the first semiconductor region and the gate electrode layer and for connecting the first semiconductor region and the gate electrode layer to a second power supply;
   (i) a potential level discriminator, connected to the second semiconductor region via a second wiring comprising:
      a first resister connected to the second power supply;
      a second resister connected to the a first resister; and
      a comparator having one input terminal receiving a potential at a connection point between the first and second resistors and another input terminal receiving a potential at the second wiring; and
   (j) fourth wiring for connecting the second gate electrode layer to an output side of the comparator;
   wherein a temperature sense output is provided by an output of the potential discriminator.

8. The sensor of claim 7, wherein the biasing means comprises,
   a high impurity concentration contact region of first conductivity type formed on the semiconductor substrate,
   a fourth contact hole arranged on the contact region, and
   a third wiring for connecting the contact region to the first power supply via the fourth contact hole.

9. The sensor of claim 8, wherein potential at a connection point between the first resistor and the second resistor is input into a negative side input terminal of the comparator, and potential at the second wiring is input into a positive side input terminal of the comparator.

10. The sensor of claim 8, further comprising:
    an inverter connected between the second gate electrode layer and the output side of the comparator.

11. The sensor of claim 10, wherein potential at a connection point between the first resistor and the second resistor is input into a positive side input terminal of the comparator, and potential at the second wiring is input into a negative side input terminal of the comparator.

12. A sensor comprising:
   (a) a semiconductor substrate of a first conductivity type;
   (b) a first semiconductor region of a second conductivity type formed on the semiconductor substrate;
   (c) a second semiconductor region of a second conductivity type formed on the semiconductor substrate and configured such that the first semiconductor region and the second semiconductor region opposed to each other at a first opposing area and a second opposing area provided at different position from the first opposing area on a planar pattern;
   (d) a gate insulating film formed on the semiconductor substrate between the first and second semiconductor regions;
   (e) a first gate electrode layer formed on the gate insulating film and provided on the first opposing area;
   (f) a second gate electrode layer provided on the second opposing area independently of the first gate electrode layer;
   (g) a third gate electrode layer provided on the third opposing area independently of the first gate electrode layer and the second gate electrode layer;
   (h) means for biasing the semiconductor substrate to a predetermined potential by connecting the semiconductor substrate to a first power supply;
   (i) a first wiring for connecting the first semiconductor region and the gate electrode layer mutually and connecting the first semiconductor region and the gate electrode layer to a second power supply; and
   (j) a potential level discriminator connected to the second semiconductor region via a second wiring, comprising:
      a first resister connected to the second power supply;
      a second resister connected to the a first resister; and
      a comparator having one input terminal receiving a potential at a connection point between the first and second resistors and another input terminal receiving a potential at the second wiring;
   wherein a temperature sense output is provided by an output of the potential discriminator.

13. The sensor of claim 12, wherein the biasing means comprises,
   a high impurity concentration contact region of first conductivity type formed on the semiconductor substrate,
   a fourth contact hole arranged on the contact region, and
   a third wiring for connecting the contact region to the first power supply via the fourth contact hole.

14. The sensor of claim 12, further comprising:
   a control circuit having a first output terminal and a second output terminal;
   a fourth wiring for connecting the first output terminal to the second gate electrode layer; and
   a fifth wiring for connecting the second output terminal to the third gate electrode layer.

15. The sensor of claim 1, further comprising:
   a third semiconductor region of second conductivity type formed on the semiconductor substrate; and
   a branch wiring for connecting the third semiconductor region to the second semiconductor region.

16. The sensor of claim 15, wherein the third semiconductor region is made up of a plurality of regions, and
   the plurality of regions and the second semiconductor region are connected by the branch wiring.

17. The sensor of claim 1, wherein corner areas of the second semiconductor region other than those opposing to the first semiconductor region are formed as a round shape or a polygonal shape respectively.

18. The sensor of claim 1, wherein a plurality of second contact holes are arranged on a substantially overall area of the second semiconductor region.

19. The sensor of claim 18, wherein a density of the second contact holes is reduced at corner portions of the second semiconductor region relative to that a central portion of the second semiconductor region.

20. A semiconductor temperature sensor comprising:
   (a) a first transistor whose substrate is connected to a first power supply and whose gate electrode and drain electrode are connected to a second power supply;
   (b) a first leakage path connected to the drain electrode;
   (c) a second leakage path connected to the source electrode of the first transistor;
   (d) a first resistor connected to the second power supply;
   (e) a second resistor connected to the first resistor; and
   (f) a comparator having one input terminal which receives a potential at a connection point between the first resistor and the second resistor and another input terminal which receives a potential at the source electrode.

* * * * *